United States Patent
Adams et al.

(10) Patent No.: US 6,898,636 B1
(45) Date of Patent: May 24, 2005

(54) METHODS AND SYSTEMS FOR INTERCHANGING DOCUMENTS BETWEEN A SENDER COMPUTER, A SERVER AND A RECEIVER COMPUTER

(75) Inventors: Mark S. Adams, New York, NY (US); John M. Muldoon, Belle Mead, NJ (US); William Joseph Conklin, Edison, NJ (US); Richard Edward Jenkins, Riverside, CT (US); Randie Lee Moss, New Rochelle, NY (US)

(73) Assignee: Intralinks, Inc., New York, NY (US)

( * ) Notice: Subject to any disclaimer, the term of this patent is extended or adjusted under 35 U.S.C. 154(b) by 0 days.

(21) Appl. No.: 09/498,206

(22) Filed: Feb. 4, 2000

Related U.S. Application Data

(60) Provisional application No. 60/118,633, filed on Feb. 4, 1999.

(51) Int. Cl.[7] .............................................. G06F 13/00
(52) U.S. Cl. ....................... 709/229; 709/217; 713/201; 707/1
(58) Field of Search ................................. 709/229, 225, 709/217, 227; 713/201, 200; 707/1, 10

(56) References Cited

U.S. PATENT DOCUMENTS

| | | | | |
|---|---|---|---|---|
| 5,903,723 A | * | 5/1999 | Beck et al. .................. | 709/200 |
| 6,148,342 A | * | 11/2000 | Ho ............................. | 709/225 |
| 6,223,177 B1 | * | 4/2001 | Tatham et al. ................. | 707/9 |
| 6,233,608 B1 | * | 5/2001 | Laursen et al. ............. | 709/217 |
| 6,253,326 B1 | * | 6/2001 | Lincke et al. ............... | 713/201 |
| 6,266,692 B1 | * | 7/2001 | Greenstein .................. | 709/206 |
| 6,385,644 B1 | * | 5/2002 | Devine et al. .............. | 709/206 |
| 6,397,261 B1 | * | 5/2002 | Eldridge et al. ............ | 713/171 |
| 6,493,760 B1 | * | 12/2002 | Pendlebury et al. ........ | 709/229 |
| 6,515,988 B1 | * | 2/2003 | Eldridge et al. ............ | 370/389 |
| 6,591,291 B1 | * | 7/2003 | Gabber et al. .............. | 709/206 |
| 6,718,367 B1 | * | 4/2004 | Ayyadurai ................... | 709/206 |
| 2002/0162027 A1 | * | 10/2002 | Itwaru ......................... | 713/201 |

OTHER PUBLICATIONS

M. C. Chan et al.; Customer Management and Control of Broadband VPN Services; Integrated Network Management; pp. 1–14; 1997.*

T. Braun et al.; Virtual Private Network Architecture; pp. 1–31; Apr. 1999.*

* cited by examiner

*Primary Examiner*—Kenneth R. Coulter
(74) *Attorney, Agent, or Firm*—Greenberg Traurig LLP

(57) ABSTRACT

A method for storing, accessing and interchanging voluminous confidential documents for review by a plurality of parties and for notifying selected ones of a plurality of receiving computers generally operated by unrelated business organizations of receipt by a predetermined host server of such electronic documents from a sender computer for review. The documents are reviewable by each respective receiving computer over a global communications network. The sender computer and the receiving computers are registered in the host server. The method comprises selecting one or more of the plurality of receiver computers to which selected documents are to be reviewed over the global communications network are addressed, storing the respective documents in a first database that is local relative to the sender computer, replicating the documents stored in the first database in a second database that is local relative to the predetermined server, issuing a respective notification message from the predetermined server to the selected receiver computers, each respective notification message indicating replicated documents available in the second database for their respective retrieval over the global communications network, and retrieving the replicated documents in the second database by the selected receiver computers over the global communications network upon a respective user of the selected receiver computers issuing a respective download command signal to the predetermined server.

47 Claims, 18 Drawing Sheets

Type: Document

Document Category:

Please select a category from the drop-down box above, or type a new category in the space below

Document Tittle:

URL: you must precede the link this the proper prefix (i.e.http://oftp://)

FIG.4C-2

| FIG.4C-1 |
| FIG.4C-2 |

FIG.4C

DealSpace
IntraLinks

| Help | 1-888-546-5383 (North America) or 212-543-7800 (New York), +44 (0)20 7464 8535 (London) or support@intralinks.com. | User Home | Sign Out |
|---|---|---|---|

- My Profile

Welcome James Beusse

If you have questions about the service, please contact us at 1-888-546-5383 (North America) or 212-543-7800 (New York) or +44 (0)20 7464 8535 (London) or support@intralinks.com.

▶ Deals

Intellectual Property IntraLinks (Prelaunch)

▶ Recent Messages

*expand all* ➕  *collapse all* ■

By proceed beyond this page, you agree to the terms of the DealSpace End User Agreement.

IntraLinks DealSpace

IntraLinks — Business Critical Communication 1 800-308-7788

| Overview | Documents | Messages | User Home | Sign Out |
| --- | --- | --- | --- | --- |
| | | | | Help |

- New Document
- New Certified Doc.
- View All Documents

Documents for Intellectual Property page up ◀    page down ▶    expand all ✚    collapse all ▬

| Category | Type | Title ▲ | Author ▲ |
| --- | --- | --- | --- |
| ▼ Legal | | | |
| | Original 📎 | Davidson Patent Opinion | James Beusse/Holland |
| | Original 📎 | Finalized Opinion – Davidson | James Beusse/Holland |
| | Original 📎 | Tumbleweed Opinion | James Beusse/Holland |
| | Original 📎 | Finalized eXpress patent appli... | James Beusse/Holland |
| | Original 📎 | Draft Intraloan Application | James Beusse/Holland |
| | Original 📎 | Donnelly letter | Anne Wolfson/IntraLink |
| | Original 📎 | new eXpress claims from Richar... | Anne Wolfson/IntraLink |
| | Original 📎 | eXpress documentation | Anne Wolfson/IntraLink |
| | Original 📎 | "Save to IntraLinks" initial s... | Anne Wolfson/IntraLink |
| | Draft 📎 | Donnelly letter modified | James Beusse/Holland |

▶ Status Report
    Original 📎    IP Status Report, 1/7/00    Anne Wolfson/IntraLink ▶ Technical Information
    Original 📎    Acquisition Trustee    Thomas Fredell/Intralin page up ◀    page down ▶    expand all ✚    collapse all ▬

Copyright 1998–99 IntraLinks, Inc.

Document Access Report for "Draft Intraloan Application"
- To sort by a column heading, click on the arrow.
- To print, select File, Print (Frame) from your browser menu.

Created: 10/12/99 08:19 PM
Last Modified: 10/12/99 08:19 pm

Currently Authorized for Document

| Name ◄ | Company ◄ | Last Accessed ◄ |
|---|---|---|
| Adams, Mark | IntraLinks | Not Accessed |
| Beusse, James | Holland | 02/04/2000 10:22 AM |
| Forsberg, Lars | Holland | Not Accessed |
| Goldstein, Lenny | IntraLinks | Not Accessed |
| Muldoon, John | IntraLinks | Not Accessed |
| Wack, Patrick | IntraLinks | Not Accessed |

Not Currently Authorized for Document

| Name ► | Company ► | Last Accessed ► |
|---|---|---|
| Barker, Brian | IntraLinks | ... |
| Fredell, Thomas | Intralinks | ... | close window

FIG. 4J

IntraLinks DealSpace
IntraLinks
Business Critical Communication 1 800-308-7788

| Overview | Documents | Messages | | User Home | Sign Out |
|---|---|---|---|---|---|
| | | | | Help | |

Documents for Intellectual Property

*page up* ◄    *page down* ►

Click on a sender's name in order to view a message, or a column heading to resort the list of messages.

| From ▲ | Date ▲ | Subject |
|---|---|---|
| Anne Wolfson/IntraLink | 01/07/2000 01:26:44 PM | DealSpace Notification |
| Anne Wolfson/IntraLink | 12/10/99 03:46:26 PM | DealSpace Notification |
| Anne Wolfson/IntraLink | 12/10/99 03:44:42 PM | DealSpace Notification |
| Anne Wolfson/IntraLink | 12/10/99 03:42:32 PM | DealSpace Notification |
| Anne Wolfson/IntraLink | 12/08/99 06:17:32 PM | DealSpace Notification |
| James Beusse/Holland | 12/10/99 03:24:48 PM | DealSpace Notification |
| James Beusse/Holland | 12/10/99 02:27:57 PM | Learning how to use |

New Message

View All Messages

*page up* ◄    *page down* ►

Copyright 1998–99 IntraLinks, Inc.

FIG.4M

METHODS AND SYSTEMS FOR INTERCHANGING DOCUMENTS BETWEEN A SENDER COMPUTER, A SERVER AND A RECEIVER COMPUTER

This application claims the benefit of the filing date of provisional patent application, U.S. Ser. No. 60/118,633 filed Feb. 4, 1999.

BACKGROUND OF THE INVENTION

The present invention concerns generally a process and system for enabling electronic transmission, reception and management of confidential documents over a global communication network such as the internet.

More particularly, the invention is related to a method and system for distributing electronic documents containing sensitive information or data to selected entities, to a method and system for notifying intended recipients of the availability of such documents and to a method and system for tracking access, downloading and uploading of such documents.

People and businesses have become aware of the potential of the "Internet", sometimes referred to as a "global communications network", a digital communications network which connects computers all over the world. Unfortunately, security on the Internet remains imperfect, particularly since one of the Internet's design goals—an ability to route communications around damage to any node—makes it difficult to know or control the path by which any particular message will travel to reach its intended recipient, and who else will have access to it along the way.

Network software known as "groupware," such as "Lotus Notes," running on a computer network within a company (a "private network" or "Intranet"), permits individuals who have access to that particular network to work together efficiently by sharing documents, and editorial revisions to shared documents such as document updates, "redlined" revised drafts, and comments, as well as e-mail to create conference room collegiality and efficiency among employees actually separated in time and/or space without the security risks associated with the global network.

However, there is still no entirely satisfactory way for people at different companies or other entities to have the benefits of private network security, particularly for ad hoc alliances, i.e., different sets of entities coming together to function as one mega or meta entity, for the duration of some particular project. In such a case, the time and expense of actually wiring a network between two or more companies or other entities and agreeing on one common software package or standard presents a barrier to conventional network solutions. Simply using the Internet remains imperfectly secure for transmission of confidential information without some pre-arranged encryption and current methods for pre-arranging secure encryption processes have been cumbersome and unproductive.

Thus, there is a yet-unsolved problem of permitting different groups of companies or other entities to communicate securely over a global network for different projects, to quickly and inexpensively obtain the benefits of secure groupware in connection with each project, and to be able to add and drop entities without difficulty with respect to any particular project.

For example, in the banking industry, ad hoc syndicates are formed under the leadership of one or more lead banks to permit a number of agent or associate banks to participate in a major loan to a borrower. Such loans have become more common and may involve loans in excess of one billion dollars. Syndication of such large loans is used since any one bank is not prepared to lend such a large amount to a single customer. Conventionally, proposed terms of a loan are negotiated between the borrower and the lead banks, each in consultation with its advisors such as legal counsel, public-relations consultants, accountants and insurance carriers. In some instances, some advisors may be in-house advisors as employees of a given entity and thus constitute an internal team. However, the advisors in many instances may be independently associated with external entities such as law firms or major accounting firms and thus constitute either external teams or combinations of the above. The lead bank(s) negotiates with the borrower to arrive at terms and conditions for the loan, such as the interest rate, repayment schedule, security and the bank's fee for processing and syndicating the loan. The lead bank may agree to underwrite the entire loan in which case the lead bank uses syndication to create sub-loans between it and other banks to raise the funds for the loan. Generally, however, the lead bank(s) agree to lend some portion of the loan and to syndicate the balance, although even in such syndication, the associate banks independently negotiate with the lead bank on loan initiation fees. Each loan agreement between the lead bank and the associate lending bank constitutes a private document since the lead bank always attempts to make a profit by the difference between the loan initiation fee received by the lead bank and the loan initiation fee paid to any associate bank. In the general syndication type loan, where the lead bank only underwrites some portion of the loan, the lead bank will seek other banks to participate in the loan through its network of contacts with those other banks. Further, each negotiation requires transfer of relatively large volumes of documentation and data between the lead bank(s) and the associate banks or between the lead bank(s), the borrower and attorneys, accountants and other entities. While some documentation may be universally distributed, much of the documentation relating to interparty loan terms is desirably restricted to the involved parties.

Information about the borrower and the terms of the loan to be syndicated (except for the lead bank's fee) are assembled by the lead bank(s) in a loan information memorandum. Copies of the loan information memorandum are distributed to associate banks selected by the lead bank who are invited to participate in the loan. The material in the loan information memorandum is generally regarded as confidential business information by the borrower and is treated accordingly by the banks which receive it. Heretofore, loan information memoranda may have been prepared in the form of confidential paper documents or stored in compact-disk read-only memories ("CD ROMs") forwarded by non-electronic, secure delivery, such as Federal Express, to the recipients.

After reviewing the loan information memorandum, generally in consultation with legal counsel, accountants, and other advisors of its own, an associate bank may notify the lead bank of its willingness or unwillingness to participate in the loan. The associate bank may request additional information about the borrower from the lead bank or may simply propose to take some portion of the loan under terms it proposes to the lead bank. Negotiations may then occur between the lead bank and the associate bank generating more confidential data. Heretofore, such communications between the associate banks and the lead bank may have been carried out by meetings, mail, telephone or telefacsimile.

With respect to a given syndicated loan transaction, one bank may be the lead bank and another an associate bank, whereas with respect to another loan transaction, the positions of the two banks may be reversed. At any given time, a large financial center bank may be concurrently serving as lead bank for dozens of syndicated loan transactions in various stages of the syndication process and as an associate bank for dozens more syndicated loan transactions. Clearly, extensive communications are necessary for engaging in and tracking such transactions. Similar communications needs exist for many other sorts of financial transactions as well as legal transactions and other business dealings.

One form of paperless communication arrangement for financial actions is illustrated by a computer-based system available from IntraLinks, Inc. under the name IntraLoan 1.0. Such system allows for concurrently interconnecting, on a project-by-project basis, members of a plurality of groups of parties. Each group is associated with a particular project so that members of the group can communicate among other members of the group over a global communications network which defines a "virtual network" associated with that project effectively for the duration of the project. Although the above-referred Intraloan I system has provided solutions to some of the foregoing drawbacks of hard-copy communications, one notable deficiency of the above described IntraLoan system is its limitation to an interface not readily conducive for conventional Internet communication. In particular, Interloan 1.0 requires that each participant use Lotus Notes groupware as its interface so that each bank or other institution connected to the system has to be running such Lotus Notes groupware. Further, such system does not have the capability of actively notifying a user as to whether a document is available to be retrieved by that user over a global data communications network.

Thus, it would be desirable to provide a system which enables secure document transmission between users over a global communication network without requiring the users to communicate in advance to establish an encryption method.

SUMMARY OF THE INVENTION

In general, the present invention provides a method and apparatus for enabling secure transmission of documents between multiple senders and receivers. More particularly, the invention includes a secure data storage facility and a computer program operable at such facility for enabling reception, storage and transmission of securely encrypted documents with access to the documents being enabled through a global computer network using conventional network browser software having encryption capability. For example, Microsoft Corporation Internet Explorer 4.0 having 128 bit encryption capability can be used to access the data storage facility. Any receiver can download a document to which he/she has access, make modifications as desired using conventional word processors and upload modified documents with comments to the storage facility. However, original documents at the facility may only be modified by selected persons having authorization to edit such originals. The invention may also provide read-only capability to selected users and preclude upload capability by other selected users. Further, the invention includes active notification to intended document reviewers of the presence of a document at the secure storage facility for review.

Additionally, the present invention provides a computerized method for actively notifying one or more of a plurality of receiving computers generally operated by unrelated business organizations of receipt by a predetermined host server of electronic documents from a sending computer. The sending computer and the receiving computers are each registered in the host server and each are interconnectable to the host server through the global computer network. The method allows for selecting one or more of the plurality of receiver computers to which the respective documents to be retrieved over the network are addressed and further allows for coding the respective documents to establish a level of access. The documents are transferred by the sender to the storage facility (a "network server") for access by selected receiver computers.

Software resident at the server allows the sender to issue respective notification messages from the server to the selected receiver computers, each respective one of the notification messages indicating that documents are available in the server for their respective retrieval over the network. The selected receiver computers can access and retrieve, if permitted, documents resident at the server. During the access process, the server interfaces with the receiving computer to establish a secure data transmission process. Preferably, the communication process uses 128 bit encryption but can default to a lower encryption.

The present invention further fulfills the foregoing needs by providing a computer communication system for notifying a plurality of receiving computers generally operated by unrelated business organizations of receipt by a predetermined host server of respective electronic documents from a sender computer. The respective documents may be retrieved by each respective receiving computer over a global communications network. The sender computer and the receiving computers are registered in the host server and are interconnectable to the host server through the global communications network (the "internet"). The computer communication system may include software code or modules that allow for selecting one or more of the plurality of receiver computers to which the respective documents to be retrieved over the global communications network are addressed. A notification module allows for issuing a respective notification message from the predetermined server to the selected receiver computers. Each respective notification message indicates that documents are available for their respective retrieval over the global communications network. A retrieving module allows for retrieving the documents by the selected receiver computers over the global communications network upon a respective user of the selected receiver computers issuing a respective download command signal to the server.

BRIEF DESCRIPTION OF THE DRAWINGS

FIGS. 4A–4M collectively show interface screens for communicating data among the various users of the communication system;

DETAILED DESCRIPTION OF THE INVENTION

Figure 1:
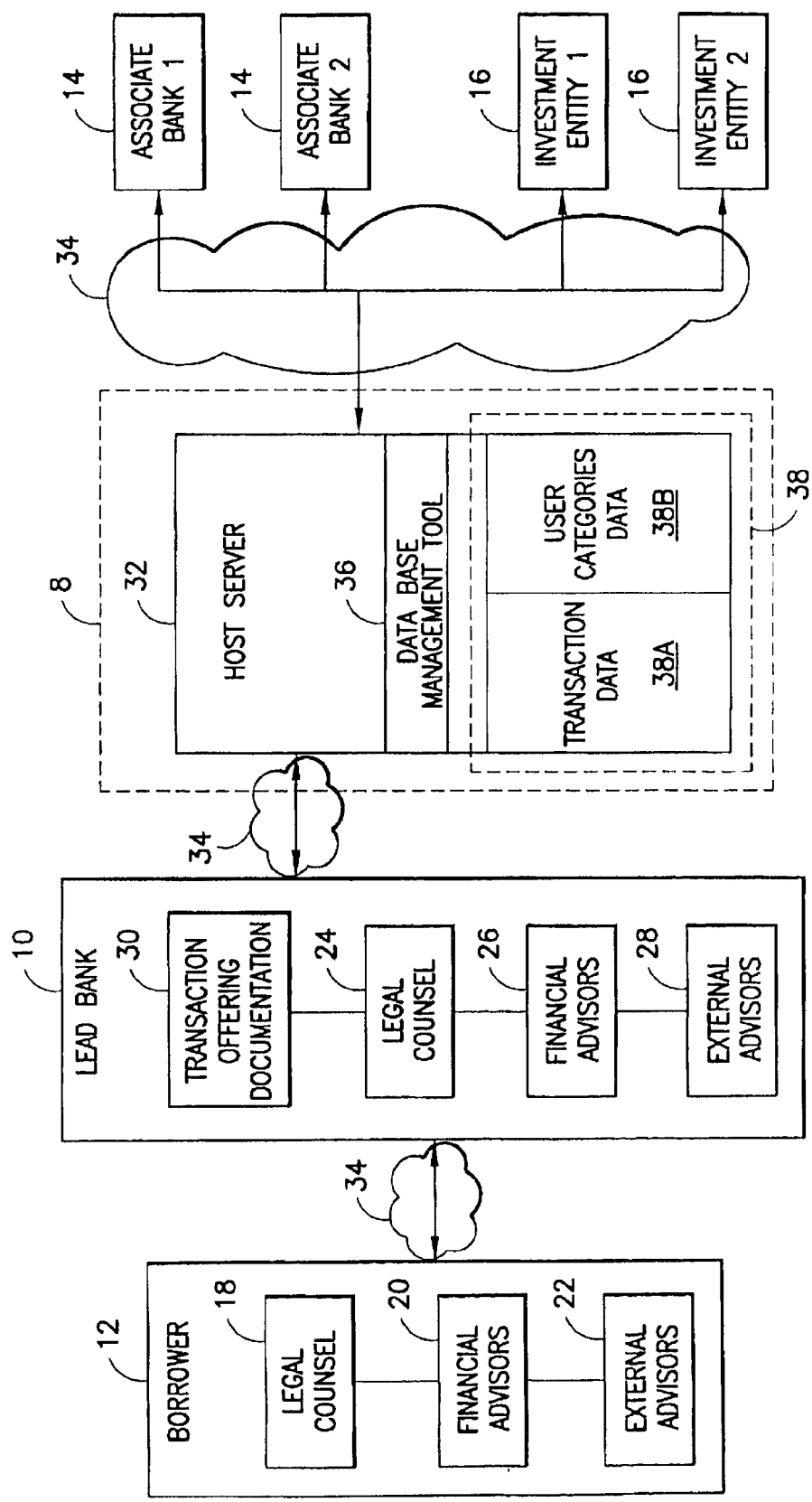
FIG. 1 is a block diagram showing one exemplary embodiment of a communication system in accordance with the present invention.

As suggested above, the present invention can be used for many types of communications between different parties that are associating for a temporary transaction or project, but as competitors or for other reasons are not suitable for a permanent communication network (LAN or WAN) as might be used for a single government agency or single corporation. Projects involving financial transactions are particularly suitable, although not necessarily the only sort of project appropriate, for the method of the instant invention.

Financial transactions suitable for project-based usage-monitoring virtual networks of the invention include but are not limited to:
loan syndication
bond underwriting
equity underwriting
high yield debt placement
private placement asset/corporate financing
mortgage finance
municipal finance
asset-backed finance
primary insurance
reinsurance
acquisition or divestiture deals For purposes of illustration and not of limitation, a preferred embodiment of the present invention in the context of a loan syndication will be described below. In this example, a network service provider (not to be confused with an internet service provider or ISP) which is preferably neither a bank nor a borrower, provides a central node for each virtual network in a collection of virtual networks corresponding to a plurality of different syndicated loan transactions. The network service provider advantageously can provide a suitable level of security with respect to each of the shared transactions, among companies that commonly may be vigorous competitors, with numerous confidential documents that the companies do not want uncontrollably shared among other members of the loan-project group or accessible by outsiders generally. While use of a separate network service provider is particularly preferred, alternatives within the scope of the instant invention are clearly possible, such as the lead bank, one associate bank, or the borrower client providing the central node of virtual networks, and thus constituting the network service provider for one or more transactions.

Some embodiments of the system, particularly in the context of loan or underwriting syndication, provide fast and easy access for associate banks. Associate banks can simply pay a monthly subscription fee to the network service provider for each location, each deal, or each person accessing the network service provider's network. Users can access the service via a communications link provided by a private network provider or a public Internet access provider such as AOL or Time Warner Cable.

Preferably, the system provides a fully provisioned, turnkey service for users, e.g., lead banks, or other underwriting institutions. Once the lead bank or other underwriting institution has established an account with the service provider, documents in electronic form can be uplaoded to the secure site maintained by the service provider. Within a relatively short period of time, the documents are accessible via an internet connection to the network service provider. A variety of collaborative communications options can be chosen by the underwriting institution including e-mail, video broadcasting, video conferencing, and "white boarding" to augment interactive access to the documents.

Any bank or financial institution can be connected to any other entity via a "virtual link" that is established only for a limited time, such as the loan offering period or the loan offering period through the time of closing of the loan followed by the period the loan remains outstanding. These banks become "associate banks" which are authorized by the network service company and the lead bank to access loan offering information by way of the network service provider service. Individuals within associate banks and other external organizations are issued passwords or other access codes which give them access only to those memoranda that are approved by their institution and the lead bank. The term "virtual link" is used to connote a system in which the user has essentially direct access using a password or other codes but which can be readily terminated by canceling the access codes.

Preferably, the network service provider provides a secure virtual network (or "intranet") for the financial community that supports the secure electronic dissemination of confidential information documents, memoranda and related information and associated communications.

Any authorized bank or financial institution can access information on syndicated loans from any lead bank as long as they have internet access and are authorized by the lead bank.

As suggested above and illustrated in FIG. 1, the network service provider may provide a web-based computer communication system 8 in accordance with the present invention for managing and developing transaction-related data, such as may be used for funding a syndicated loan, or for closing a business deal involving multiple unrelated business organizations. Communication system 8 can provide a virtual network connection among a lead bank 10, a borrower 12, and respective groups of associate banks 14 or investment entities 16 selected by the lead bank for each of a plurality of syndicated loan offerings. Communications between borrower 12 and lead bank 12 may include on the borrower's side various personnel such as its respective legal counsel team 18, its respective financial advisors 20, and other advisors including external advisors 22 to the borrower. Similarly, on the lead bank's side such personnel may include its respective legal counsel team 24, its respective financial advisors 26 and other advisors including external advisors 28 relative to the lead bank. The foregoing communications among such diverse personnel may be in connection with negotiating the terms of a respective loan offering and, in accordance with the techniques of the present invention, may be carried out securely over the virtual network associated with the respective loan offering. In conjunction with negotiating the terms of the loan offering, a package of transaction offering documentation 30, such as a loan information memorandum including applicable legal, regulatory and financial documentation can be prepared by the lead bank, with drafts and revisions of the memorandum and communications relative to it being passed over the virtual network among the lead bank, the borrower, and their respective advisors.

Once the loan information memorandum has been completed, it can be controllably distributed or disseminated electronically via a host server 32 loaded with suitable server software for permitting distribution of the information over the virtual network to associate banks 14 selected by the lead bank. The lead bank may then negotiate individually with each associate bank to arrive at separate agreements detailing the amount of the total loan which each bank will lend and the fee that each bank will charge for entering into the loan agreement.

Figure 2:
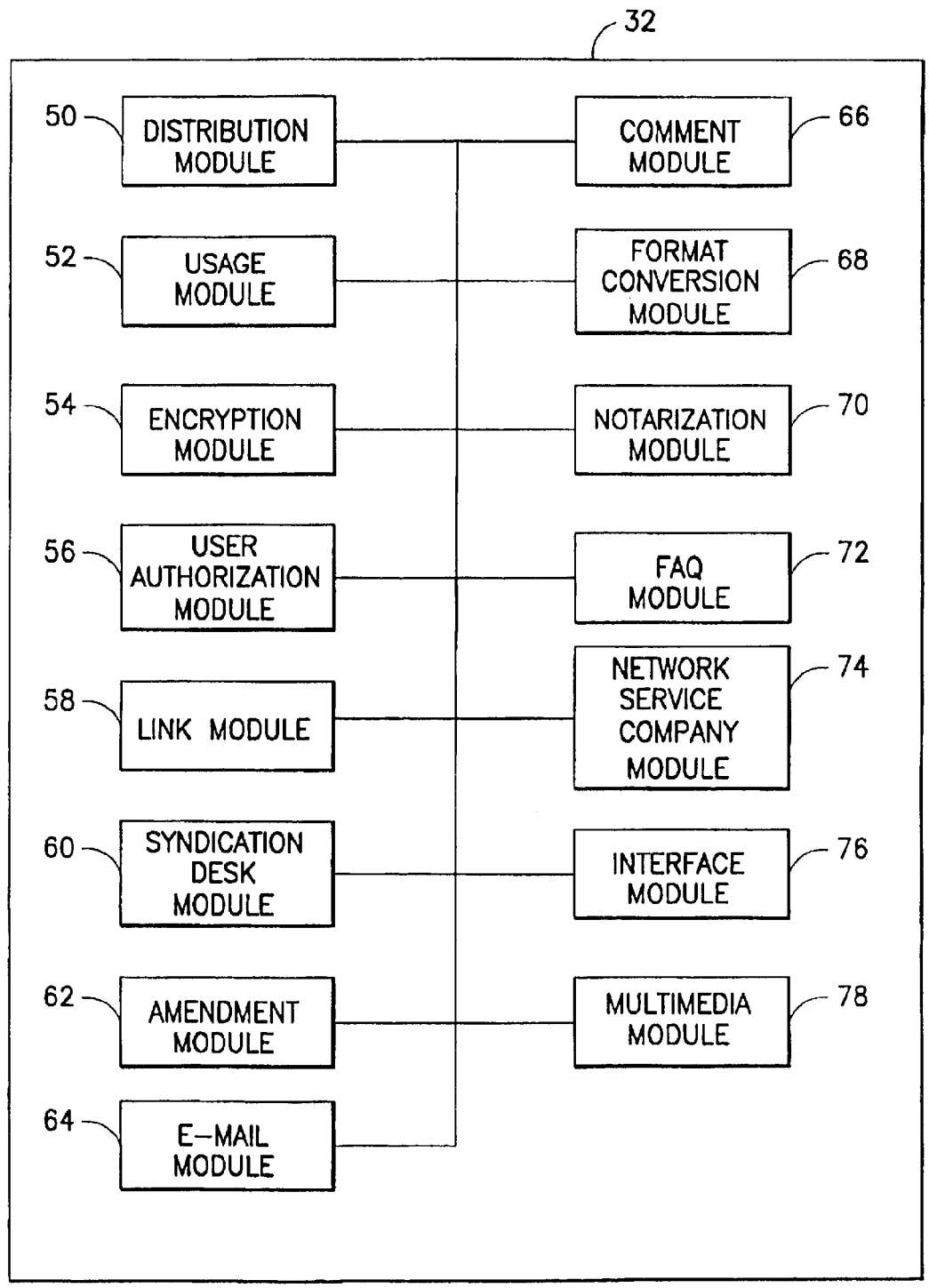
FIG. 2 is a block diagram showing exemplary operational modules of a host server that may be used by the communication system shown in FIG. 1.

FIG. 2 shows further details in connection with the server software which may 15 be readily incorporated in host server 32. For example, a distribution module 50 allows host server 32 to electronically distribute the loan information memoranda and other financial information related to syndicated loan offerings as well as secure communications among the banks to enable them to conclude the loan transactions efficiently. As suggested above, a usage module 52 allows host server 32 to monitor the usage of each virtual network to permit the borrower in the loan associated with the virtual network to be billed for the virtual network service used in connection with the syndication of the loan for that borrower. Communication system 8 can set up and manage a plurality of separate virtual networks concurrently, with each such virtual network handling a different loan syndication transaction. Communication system 8 (FIG. 1) through host server 32 can offer a high level of security for all documents and information by employing, as needed, a private communication network 34, (FIG. 1) such as the "IBM Global Network" ("IGN"), AT&T or MCI, or other providers of substantially secure Internet connections, and by means of security and encryption technologies developed for intranets such as may be readily incorporated in an encryption module 54. It will be appreciated that the present invention need not be limited to a private communications network since the Internet could be used in lieu of the private network in situations where, for example, security considerations may not be as critical as the timeliness of the communication, as may occur if private network 34 is temporarily disabled and the like. Additionally, host server 32 provides highly secure access control by way of a user authorization module 56 which allows only authorized personnel to access individual memoranda and related documents and communications.

Host server 32 can give each lead bank the ability to electronically link or be interconnected via link module 58 with any number of associate banks or other external entities into a virtual network that may be established only for the time a loan information memorandum is active, or the time the loan transaction generally is active. Law firms, public relations firms, and other companies involved in the syndicated loan process can also be connected via the network service company's virtual network as easily as associate banks that are evaluating the offering. Although documents may be preferably formatted in a Portable Document Format (PDF), such as may be readily implemented with a commercially available document exchange programs such as an Adobe Acrobat program and the like, other formats could be optionally accommodated using a suitable format conversion module 68. A multimedia module 78 may also be used to process any data to be sent over the virtual network suitable for presentation to the user in forms other than text such as audio, still or moving images, and the like. Further, a notarization module 70 is provided so that any syndicated desk managers have the ability to electronically certify any electronic document forwarded to the users. In a preferred embodiment, notarization module 70 may incorporate electronic signature technology owned and developed by Bell Labs and made commercially available through their sales organization. Thus, the investors and external users may readily verify the authenticity of the alleged source of a given documents and attachments, if any. Further, such users may verify that the document contents have not been changed without authorization. As suggested above, a Frequently Asked Questions (FAQs) module 72, may conveniently allow authorized users to electronically create, post, and edit an electronic board containing FAQs in connection with a particular transaction. It will be appreciated that although the contents of a FAQ electronic board may contain some generic questions applicable to each transaction, in general the contents of such board may vary considerably based on the specific transaction being handled. A network service company module 74 may conveniently be used to display various data in connection with the network service company such as additional services that may be available by the network service company to the users.

Figure 3:
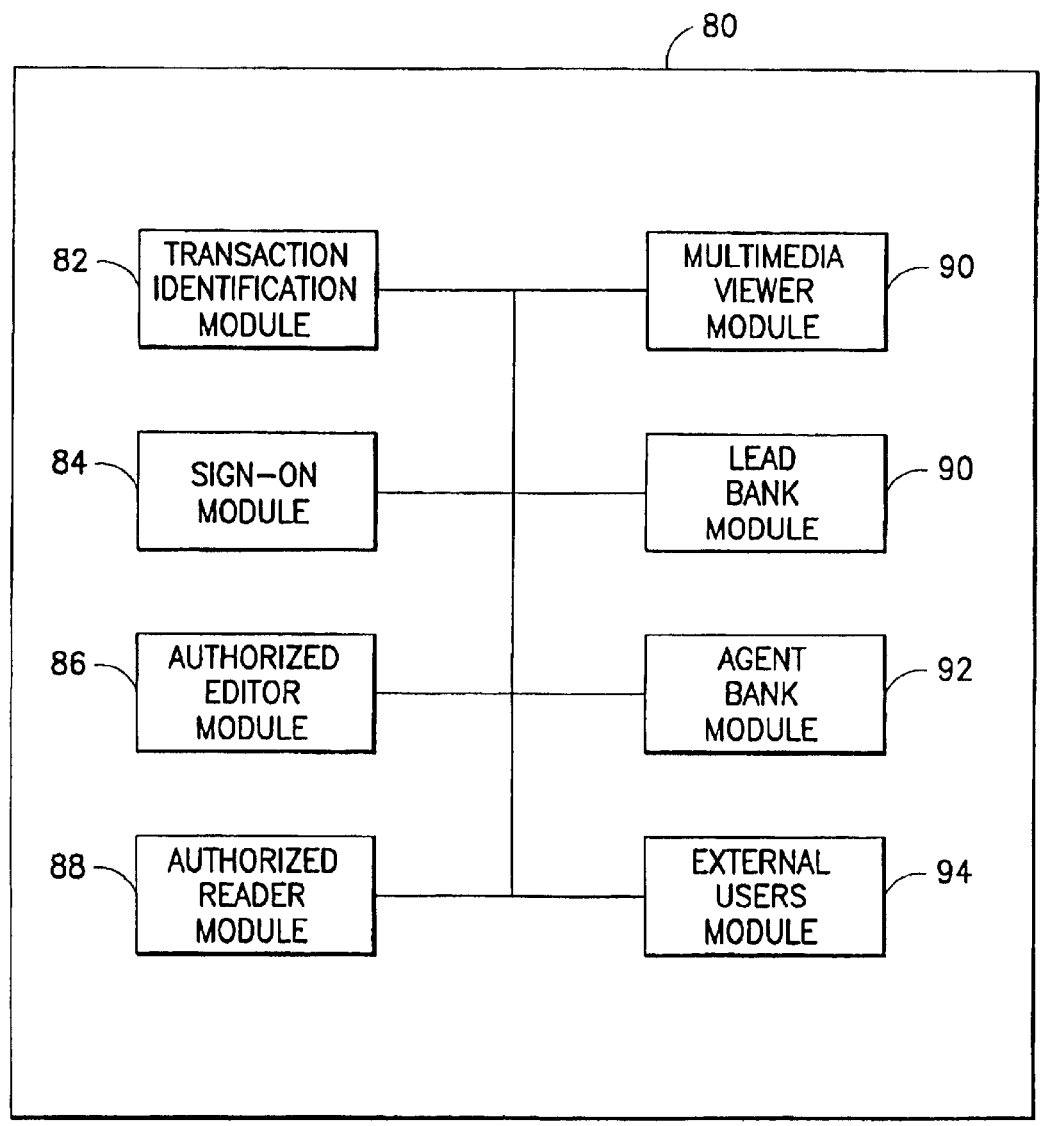
FIG. 3 is a block diagram showing exemplary operational modules that may be available to users authorized to access the host server of FIG. 2.

As shown in FIG. 3, a virtual-network viewer or browser 80 may conveniently provide the end user with an easy-to-use graphical interface to loan information memoranda and other particularly confidential information on the network service company's virtual-network service. The virtual-network service provides identification of services of the network service company available over the virtual network as well as a variety of options for accessing and retrieving financial information.

The virtual-network viewer includes a transaction identification module 82 that, for example, enables an associate bank to quickly find and access information with respect to those syndicated loan offerings for which the associate bank has been authorized to access by the appropriate lead banks. The virtual-network viewer can automatically provide any suitable connection to the user, such as a dial-up connection, to the virtual-network service through sign-on module 84. The viewer can also prompt the user to input one or more passwords or identifications which should be recognized by either an authorized editor module 86 or an authorized reader module 88 in order to access information on database 38 (FIG. 1).

The virtual-network viewer may also include a multimedia viewer module 90 configured to, for example, provide: viewing of interactive multimedia or mixed media memoranda through suitable decoders, such as audio decoders, Joint Photographic Experts Group (JPEG) still image decoders, and Moving Pictures Experts Group (MPEG) moving image decoders. The virtual-network viewer also supports various collaborative communications options such as e-mail, video conferencing and white boarding which are enabled for a given syndicated loan offering pursuant to instructions from the appropriate lead bank. Of course, the range of multimedia capability and the collaborative communications options will vary depending on the various groupware modules available to the end user. Depending of the level of authorization of a respective user, lead bank module 90 may conveniently allow that user to quickly determine which lead bank is responsible for a given transaction. Similarly, agent bank module 92 and external user module 94 may respectively inform the users of the respective agent banks and external users involved in a given particular transaction.

It will be appreciated that the end users may conveniently use commercially available Internet software browser utilities such as the "Netscape Navigator" or "Microsoft Internet Explorer" to access the virtual-network service, since the virtual-network viewer is presently designed for compatibility with such Internet browsers. Preferably, a plug-in and secure socket layer ("SSL") can be provided by communication system 8 for additional security.

As will be appreciated by those skilled in the art, the browser software and plug ins in the user computers may conveniently provide the following functions:

Access

Access to the virtual-network-service host site through the subscribers existing Internet connection and Internet browser software, or through a suitable client software, such as "Lotus Notes" client software;

Automated response to security and password inquiries;

Activation
  Prompt the user at a subscriber associated bank to enter a password and any other input required for verification, such as a digital signature or key encryption codes;
  Automatically send the password and other information to the virtual-network-service host site;
  Log the user into the virtual-network-service host site and the relevant authorized databases once verification of the password is successfully completed;
Security
  Provide access security for both "Notes" and Internet browser clients using advanced security procedures;
  Provide transmission security for both "Notes" and Internet browser clients including encryption/decoding of transmitted files;
  Require frequent subscription renewal to restrict subscriber access to short intervals such as monthly intervals;
Viewing
  For Internet browser clients, permit viewing of Standard Generalized Markup Language (SGML) pages, such as Hyper Text Markup Language (HTML) pages and play back of multimedia elements;
  For "Notes" groupware clients, permit viewing of "Notes" pages and play back of multimedia elements;
  Permit viewing of virtual-network-service company coded, multimedia loan information memoranda and related information by authorized users only;
  Permit viewing of related documents and files such as e-mail Messages and attachments, and v-mail communications by authorized users only;
Communications
  Transmit and receive e-mail for public forums and for private communications to the lead bank;
  Receive and play back video-mail communications;
  Enable participation in two-way, real-time collaborative communications such as video conferencing and white boarding regardless of client software being used.

Depending on a variety of factors, some users, such as associate banks, and some deals may require different communication bandwidths in order to access the virtual-network service and to download information with acceptable latency for their own unique needs. The network service company can consult with an associate bank to help the bank determine the best possible communications options-for its particular needs, taking into account the bank's existing communications capabilities, connections to private communication networks and other factors.

A wide range of communication-link services and options are presently available to businesses. Many of these services are available almost ubiquitously throughout the United States. The communication link services generally vary in cost depending on bandwidth, distance between nodes, traffic, and other factors. Some common types of communication links today are:
  modem, with a maximum bandwidth of 56.6 Kbps or so,
  Integrated Services Digital Network (ISDN), with maximum bandwidths of 64 Kbps and 128 Kbps,
  T-1, with a maximum bandwidth of 1.544 Mbps or so,
  Cable Modem, with a maximum bandwidth exceeding 30 Mbps.

Future improvements in high speed communication links and modems can be expected to further improve performance of the present invention.

ISDN and T-1 connections are substantially dedicated communication links and would enable the participant bank to link directly to communication system 8 for a fixed monthly fee. On the other hand, dial-up communications utilizing the public switched telephone network (PSTN) generally avoids such fixed monthly costs to the participant bank, although the communications speed over the public switched telephone network is slow relative to the ISDN and T-1 connections, especially for multimedia information. There are other high-bandwidth links available as well from a variety of carriers and Internet access providers.

As suggested above, a private communication network such as the "IBM Global Network" can also provide associate banks with additional security and with fast access to the virtual-network service. As will be appreciated by those skilled in the art, computer communication system 8 conveniently establishes an intranet or extranet when using such private communication network, as indicated generally in FIG. 1. Such an intranet or extranet can have the look-and-feel of the Internet, without compromising the security of the information exchanged or distributed therethrough. Thus, while associate banks can have the option of accessing the virtual-network service of the network service company via their existing communications links and/or Internet access, they can also elect to have local access provided by the private communication network. Those companies that may not want to use their existing communications lines for access to the network service company or those companies that do not currently have access to the Internet or sufficient bandwidth to handle the virtual-network service in addition to their normal Internet access can utilize the services of the private communication network for access to the network service company intranet.

As suggested above, many companies access the Internet either through dial-up or dedicated communications lines. The virtual network is effectively an intranet or extranet, so anyone accessing the Internet can quickly become a user of the virtual-network service using their existing skills, software, and Internet access provider. However, in contrast to the public accessibility of the Internet, end users must have a subscription to the virtual-network service, and/or have a valid password assigned by their company for access to the service.

As will be appreciated by those skilled in the art, associate banks will want to ensure that their employees who have been authorized to use the virtual-network service are able to access the service and to view and download information quickly. Although most of the information that can be accessed and downloaded may be text data, there are a variety of factors that will impact the speed with which users can retrieve the information they want. Three important factors in communications are load factor, acceptable latency, and bandwidth. These three factors may be appropriately balanced so that generally optimal communications can be achieved in order to make the experience satisfying and convenient to the end user.

For example, one significant factor is the number of users at an associate bank who will be simultaneously using the communications link to the virtual network. The number of simultaneous users is called "load factor." Each associate bank's load factor should be reasonably predicted in order to determine an appropriate bandwidth of the communications link to the virtual network. For example, if an associate bank authorizes 100 people in a given month to have a subscription to the virtual-network service and predicts that 20 of those 100 people will be using the service at any given time, then the bank has a load factor of 20. The more people using the link at any given time will impact the speed with which any one user can move through the service host site and retrieve the information he or she is seeking.

"Latency" refers to the time it takes to perform a function on the virtual network. For instance, if a user wishes to play a video clip over regular phone lines, it will take some time for that video clip to be transmitted at approximately 56 Kbps to the viewer. This delay, or latency, will vary depending on the function being performed and the bandwidth of the communications link between the end user and the host site of the network service company. When an associate bank has many users accessing the virtual-network service, the latency each of those users experiences will depend on the bandwidth of the communications link and the load factor. In general, the greater the bandwidth, the shorter the latency, other factors being equal. Acceptable latency periods should be reasonably determined in addition to predicted load factors in order to help associate banks determine the bandwidth needed to provide information with acceptable latency periods.

While bandwidth may be a flexible variable in the communications equation, high bandwidths can also be quite costly. It may be necessary from time to time and from user to user to make a trade-off between costs and latency in choosing a bandwidth for the communications link to any given virtual-network service.

For the convenience of the end users, some segments of the loan information memoranda offered through the virtual-network service may be designed as interactive multimedia documents that will include video, graphics, audio and other multimedia elements. Multimedia communications provide the end user with a wide variety of information in addition to that provided by a standard text memorandum. However, multimedia information can be substantially taxing on a communications virtual network. A bank should take this into consideration as it is assessing its communications requirements.

Lead banks may be able to choose from a variety of collaborative communications options that enable them to communicate with associate banks and other external entities via a virtual network of the network service company. The collaborative communications options let a lead bank take advantage of the flexibility of the virtual networks established by the network service company to speed and improve communications among the various banks and other entities on the network.

Collaborative communications can be supported on virtual networks of the network service company, notwithstanding that banks may vary in their ability to support the various communications options depending on their communications capability and particular interfaces to the virtual-network service.

By way of example, in the context of a syndicated loan, a syndication desk, i.e., one or more individuals authorized to be responsible for the management of any given syndicated loan, of a lead bank is able to broadcast and/or selectively send e-mail messages processed by a syndication desk module 60 to associate banks and vice-versa. For example, amendment data processed by an amendment module 62 may be used to effectively make changes to a loan information memorandum. The amended memorandum can be then conveniently distributed via e-mail using E-mail module 64 for providing associate banks with up-to-the-minute information about a loan offering. Amendments or messages can be appended to the loan information memorandum at the host site of the network service company where they can ordinarily be viewed by anyone accessing the virtual-network service who is authorized to access the loan information memorandum. E-mail messages or amendments can also be downloaded for printing or for attachment to local documents associated with the memorandum. Similarly, comment data in connection with a loan offering may be processed through a comment module 66 for appropriate distribution to authorized users.

E-mail messages sent from or to a lead bank's syndication desk are secure in transit over the virtual network. After receipt, responsibility for the security of e-mail messages rests with the party which received it. The network service company can provide rapid, secure delivery of a response to the associate bank once the response is transmitted by the lead bank.

Additionally, the lead bank may be responsible for amendments to the loan information memorandum and for posting e-mail and/or amendments to the memorandum. Posting of such messages or amendments can now be securely done through the communications system without having to expend substantial resources, such as paper for hard copies or the relatively large staff that would be required to generate and track such hard copies. Lead banks can send video clips to associate banks and to organize video conferencing sessions, either with all associate banks on the network or with selected associate banks. It will be understood however that sufficient bandwidth must be available at participating associate banks to support real time, full duplex video transmission in order for a video conferencing session to occur. Lead banks can set up connections with associate banks for white boarding and for real time collaborative annotation of documents.

As shown in FIG. 1, a database management tool 36 using software techniques well known to those skilled in the art, allows for electronically coupling host server 32 to a database 38 made up of a first database section 38A where the transaction-related data may be conveniently stored. Database 38 is further made up of a second database section 38B for storing user categories data. For example, in addition to the authorized syndicate desk managers, agent bank user access to first database section 38A may be selectively controlled or categorized at least into two types, Editor and Reader.

By way of illustration and not of limitation, agent users categorized as an agent editor may for the specific transactions for which they are authorized:

- store summaries of transaction-related data or documents in database section 38A;
- edit such summaries of transaction-related data or documents stored in database section 38A;
- create a new user document requesting user access for investor or external users as well for additional agent editor and/or readers;
- authorize investor and external users to a given transaction;
- create additional contents of transaction-related data for storage in database section 38A, including Frequently Asked Questions (FAQ) documents, and memoranda and reply documents;
- edit such additional contents, and FAQ documents;
- View activity reports in connection with a given transaction.

By way of comparison a user categorized as an agent reader may be granted access to transaction-related data stored in database section 38A but has no authority to change such data, accordingly an agent reader could:

- read summaries of transaction-related data or documents in database section 38A;

create a new user document requesting user access for investor or external users as well for additional agent readers. However, agent readers will not be able or authorized to create users with agent editor access rights;

authorize only agent readers a given transaction;

read contents of transaction-related data in database section 38A, including Frequently Asked Questions (FAQ) documents;

create memoranda and reply documents;

view activity reports in connection with a given transaction.

Figure 4A:
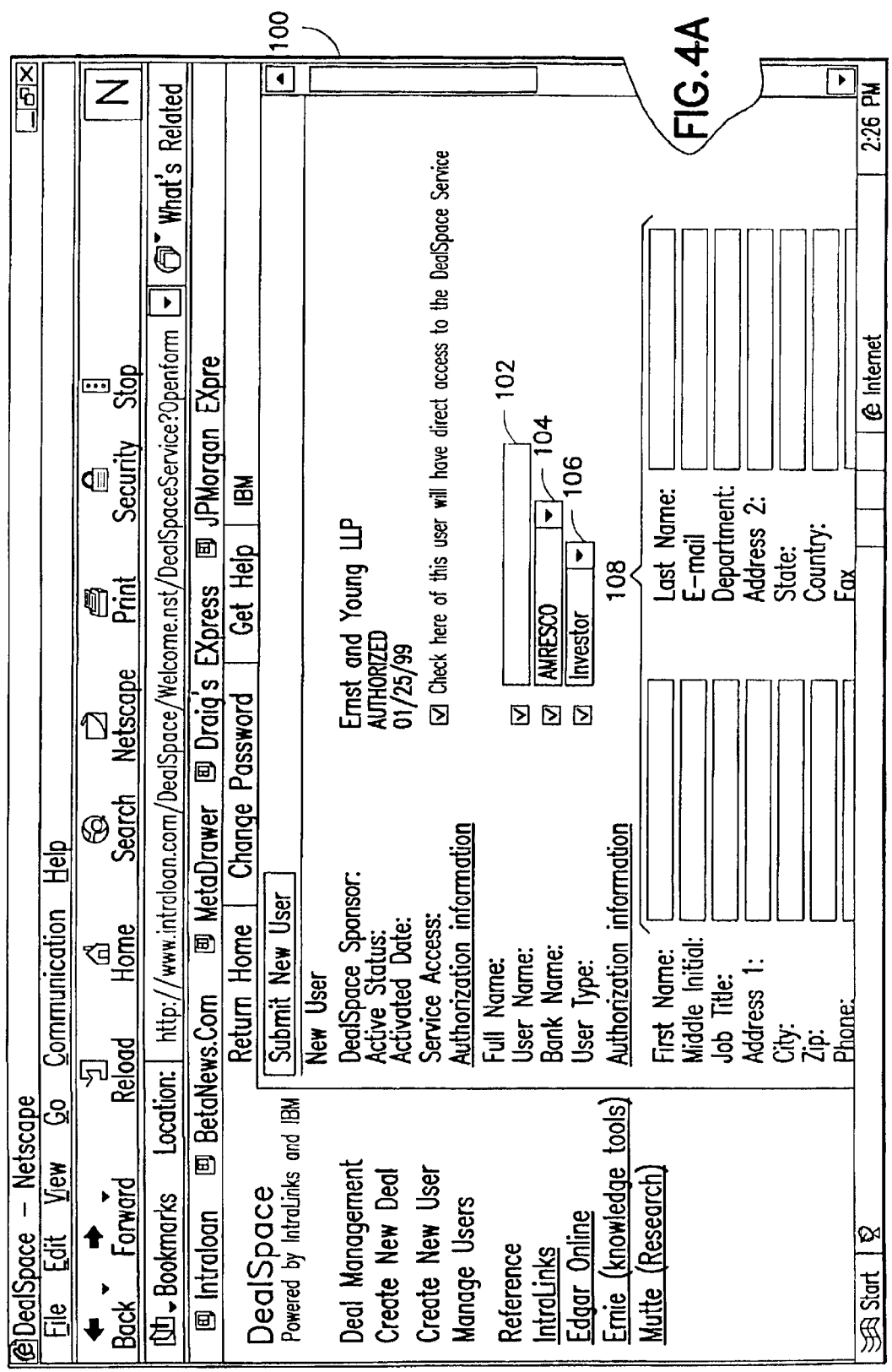

FIGS. 4A–4F collectively show various illustrative browser interface screens that conveniently allow a respective user to communicate with other users via the host server. FIG. 4A shows an exemplary interface screen 100 for electronically submitting or registering a new user. For example, an authorized transaction sponsor may enter into a datafield 102 the full name of the new user. For example, the specific agent bank employer of the new user may be selected by scrolling through a list of agent banks with an agent bank scroll indicator 104. The user access category may be similarly selected by selecting the appropriate category assigned to the user by scrolling through a list of categories with a user access scroll indicator 106. Additional details in connection with the new user, such as address, telephone number, etc., may be readily entered in datafields 108.

Figure 4B:
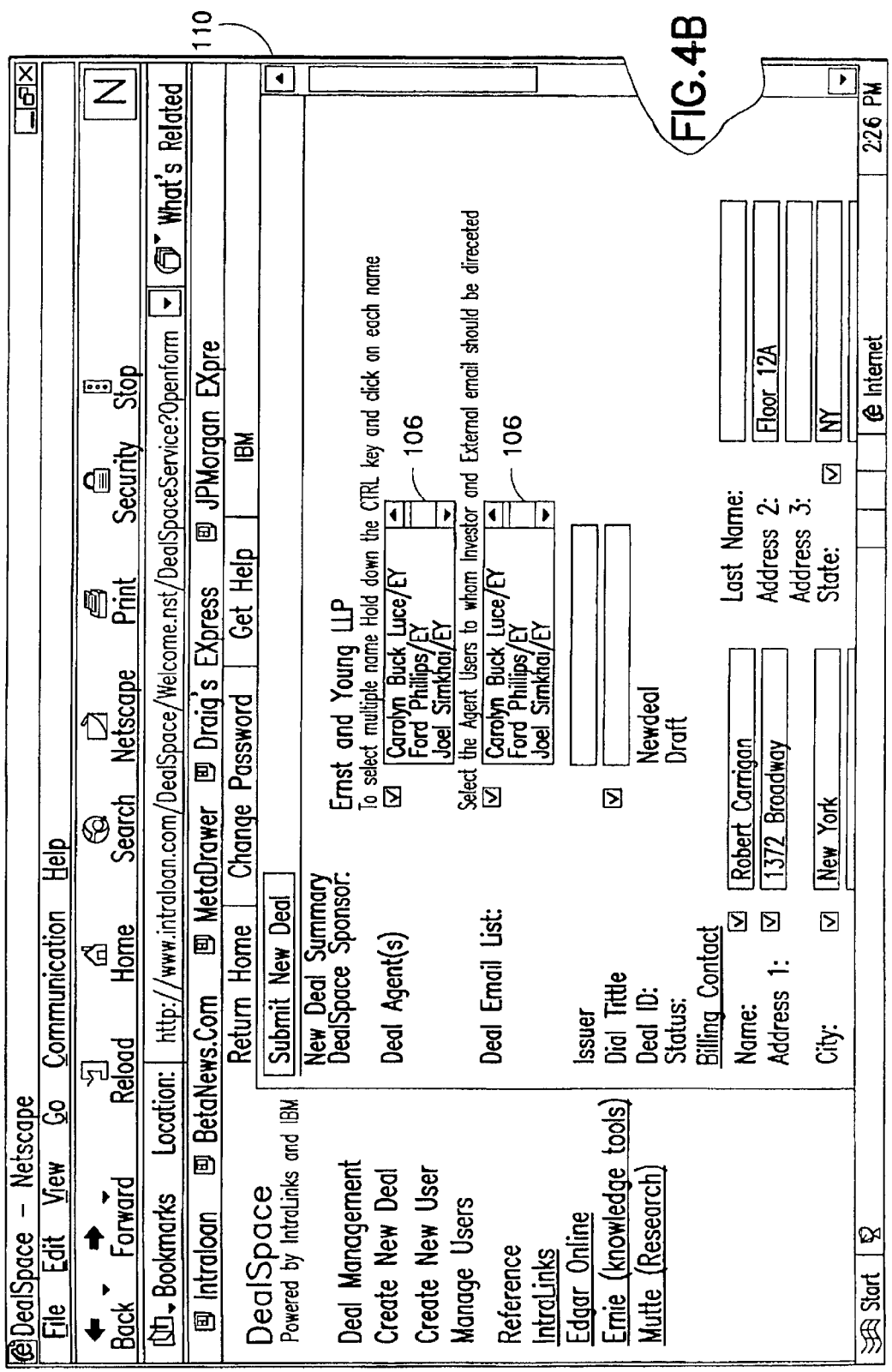

FIG. 4B shows an exemplary interface screen 110 for submitting a new transaction or deal into the system, and displaying the deal sponsor. Interface screen 110 includes respective scroll bars 112 and 114 for selecting participating deal agents and selecting a list of E-mail recipients approved to receive E-mail in connection with the deal.

Figures 1, 4C:
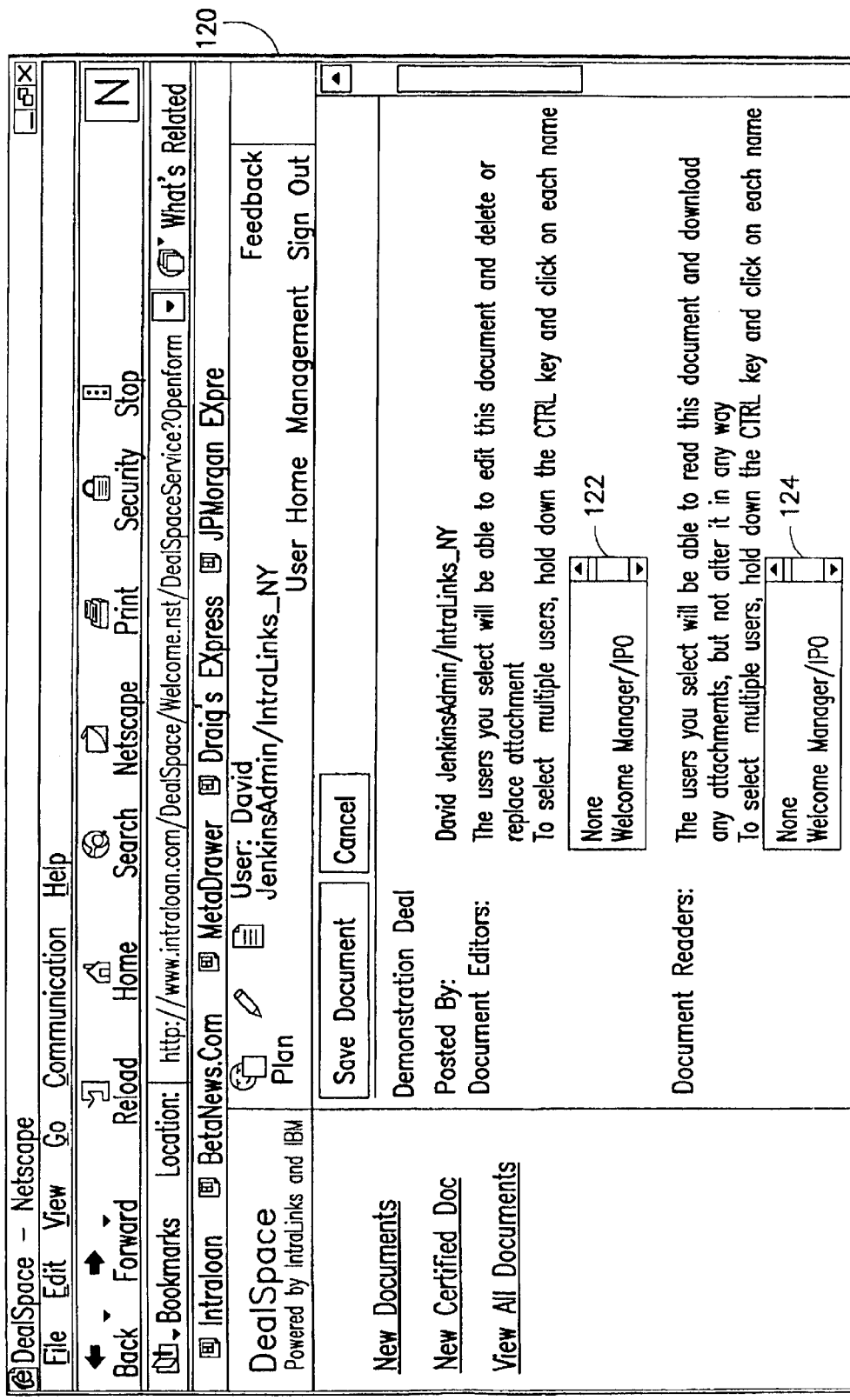

FIG. 4C shows an exemplary interface screen 120 that allows an authorized user to distribute a document while permitting that user by scroll bars 122 and 124 respectively to select respective users that will have editor rights relative to the posted document and any attachments thereto, and further permitting that user to select users that will only be able to read the document and attachments but will not be able to make alterations to the posted document or its attachments.

Figure 4D:
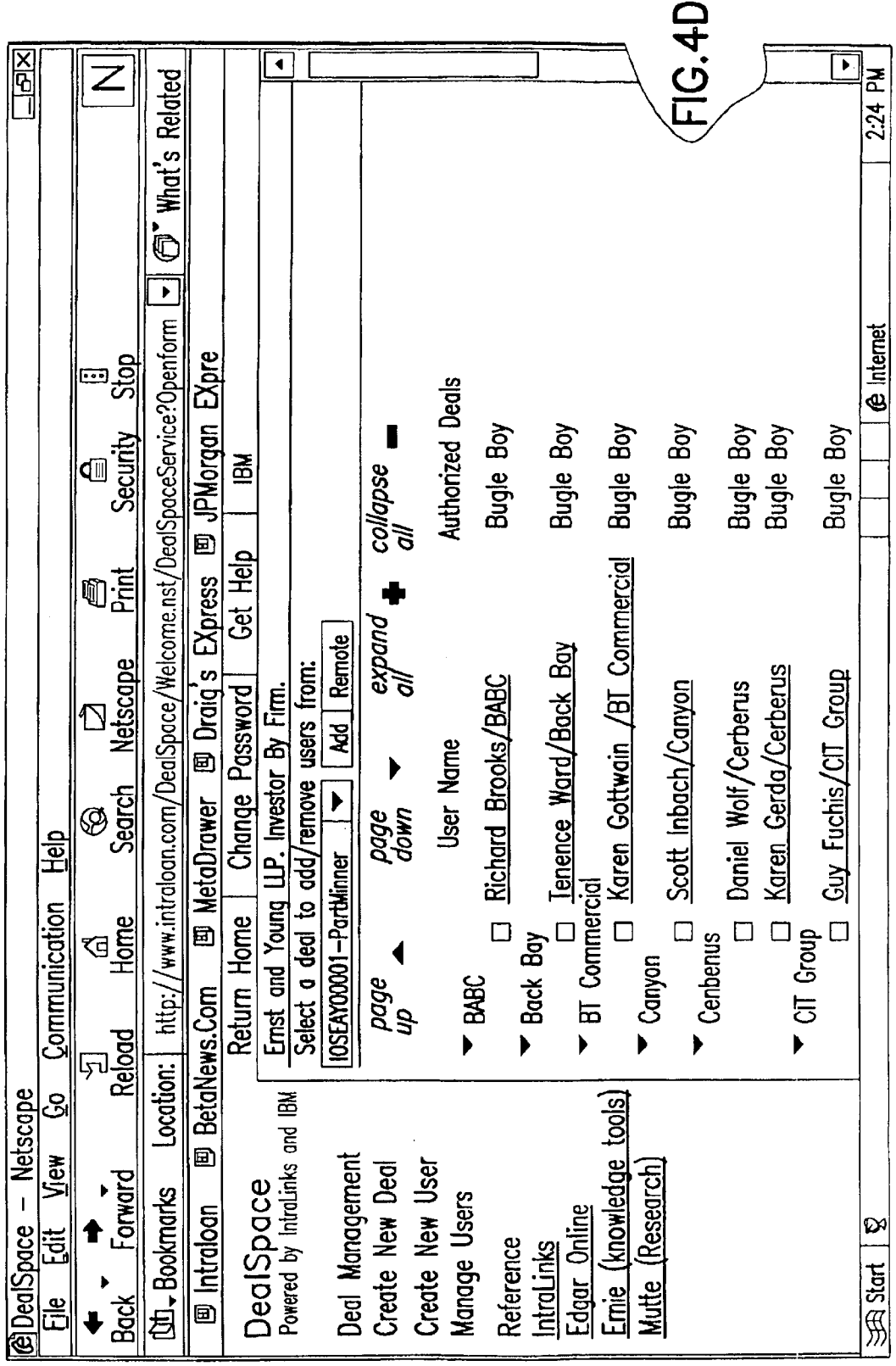
Figure 4E:
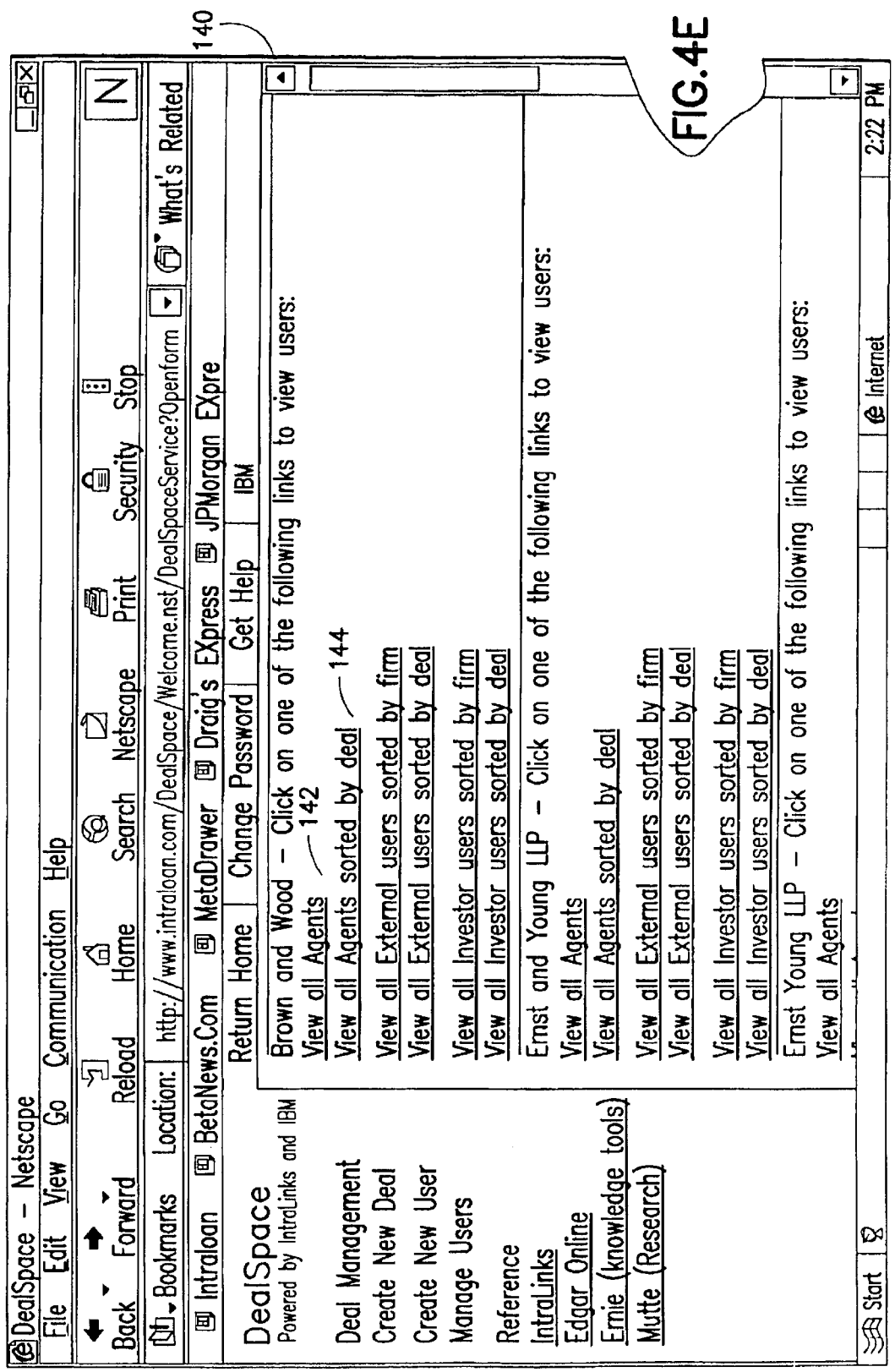

FIG. 4D shows an exemplary interface screen 130 that allows an authorized user, such as a syndicate desk manager, to add or remove users in connection with each respective deal. FIG. 4E shows an exemplary interface screen 140 that allows one or more respective users, such as respective lead banks, to list or sort the various other users, such as agent banks or external users, cooperating with that lead bank on any given deal by clicking on respective links, such as links 142 and 144. By way of example, other users participating all approved agents, to sort all such agents based on the particular deal in which they are participating.

Figure 4F:
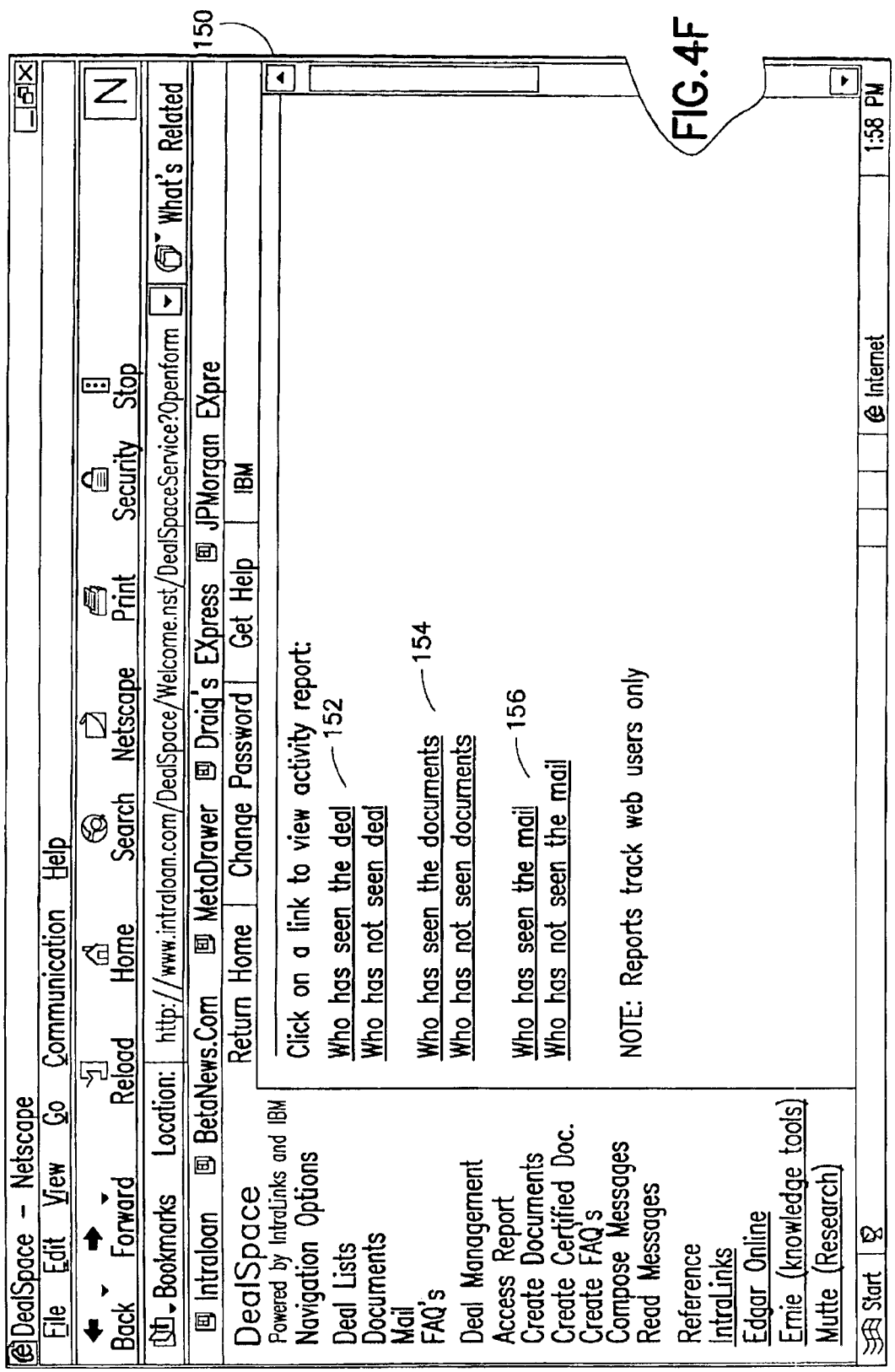
Figure 41:

In another feature of the invention, as illustrated by FIG. 4F an interface screen 150 may provide respective links, such as links 152, 154 and 156 that would allow generation of an activity report in connection with any particular transaction task required to move forward the transaction or deal. By way of example, such reports may include data that would enable a requester to quickly determine who has or has not downloaded any specific transaction-related data, such as E-mail or documents attached thereto.

By way of example, reference is now made to FIG. 4G which shows one form of potential holding screen for a person accessing a secure website hosted by a network service company such as IntraLinks, Inc. In this instance, the user James has entered his assigned user name and password so that he is taken to a first opening screen which shows all the deals to which this user has access. In this instance, there is only one deal identified as intellectual property. When user James clicks on the intellectual property link, the screen opens to what is shown in FIG. 4H listing all the documents that are currently involved in the intellectual property deal. These documents may be broken down by category such as legal documents, status report or technical information. The screen actually prints whether this is a draft or original of the document, title of the document and the author of the document. User James can then select any of the documents to expand by simply clicking on the documents which will then open the screen shown in FIG. 4I. This screen gives various characteristics of the document including the author, the date it was created, the last time it was modified and who modified the document. In addition, the screen lists the editors of the document and all of the individuals who have access to read the documents. There may also be a message associated with the document such as is listed in body indicating that the document in question is an early draft. The low pat description is a link which allows the document to be opened by clicking.

At the top of the screen shown in FIG. 4I, there are various options that can be utilized by the document editor. In this case, James is listed as a document editor. In particular, the editor has the option of adding or removing document editors, adding and removing document readers and viewing access reports. The access report is a significant feature as shown in FIG. 4J since it allows the document originator to see a list of all the people who have access to the deal and whether they have been authorized to access the document or not authorized to access the document. In addition, for each person who is authorized to access the document, the system provides a report as to when that person actually did access the document.

Figure 4K:
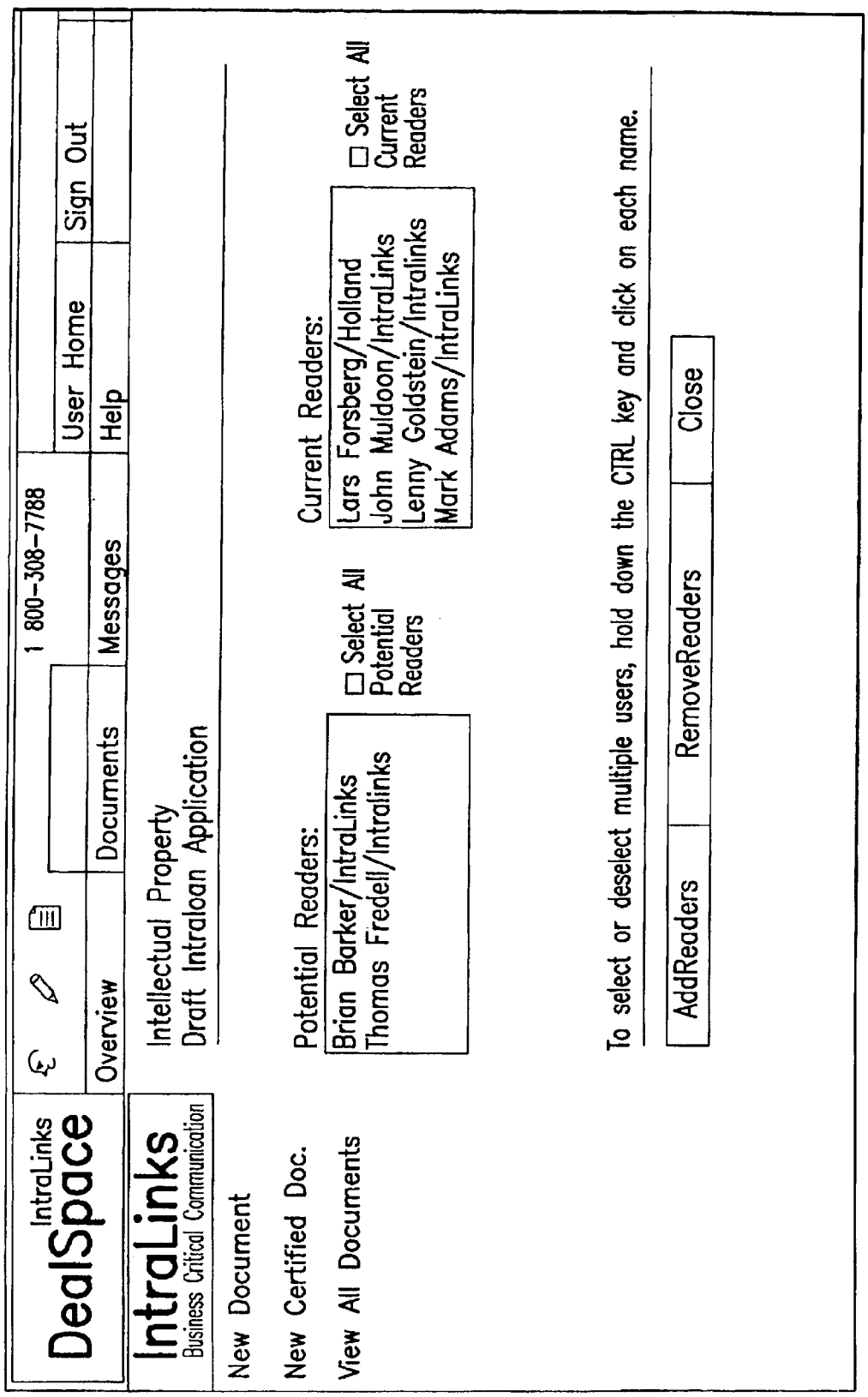
Figure 4L:
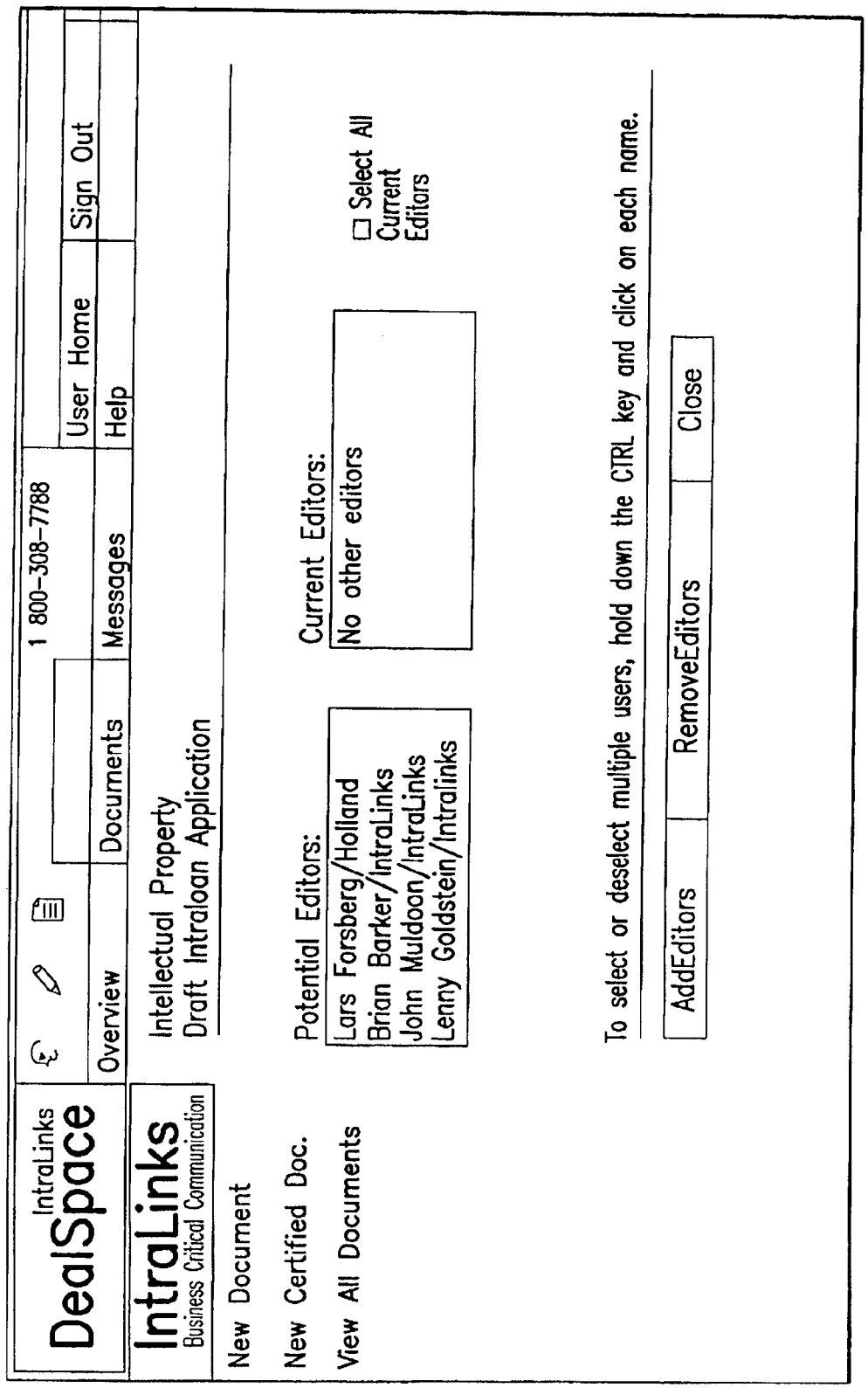

Referring again to FIG. 4I, if the originator wishes to add or remove document editors or document readers, he can click on respective ones of the links at the top of the screen which will open up the screens shown in FIGS. 4K and 4L. These two screens are essentially identical with the screen in FIG. 4K being used to add and remove document readers while FIG. 4L allows adding and removing document editors. The difference between the two types of persons having access to the document is clearly that one has the ability to edit the document while the others only have the ability to read the documents. Of course, any reader can provide feedback using e-mail to send any comments to the originator concerning a document that has been read.

In addition to the actual documents that are available on the intellectual property deal site, there are also messages that have been transmitted from either editors or readers and those can be accessed by clicking on the messages icon at the top of the display screen as shown in FIG. 4M. Each of the messages includes the sender's name, the date and actual time that the message was sent and the subject of the message. By clicking on each of the message links, the reader is taken directly to the message.

As can be seen, the system provides a secure site for placing documents and messages to be transmitted over the secure virtual network and allows authorized users to read or edit messages according to their level of authorization. Any documents that are edited are immediately available on the system so that other persons involved in a particular deal or loan scenario has access to the edited or modified documents immediately without having to wait for delivery of hard copies of these documents via a courier service. In addition, the system provides tracking of each document to allow the editors to see who has had access to the messages and documents and who has modified or edited any of the documents.

The web site powered by host server 32 may be accessible from all of the virtual networks supported by the network service company that features information about the company and the range of products and services it provides. Users of the virtual-network service can be directed to the appropriate virtual-network sites via the service host site. It is thus readily realizable to take users to the selected virtual network site automatically via a suitably coded hyperlink. The network service company can advertise its products and services on the virtual-network-service host site. In addition, advertising services may be provided to the lead banks or others in the form of marketing messages to users accessing either the service host site or the virtual-network service sites.

Each virtual-network site can be accessed independently or through the service host site of the network service company. Subscribers may use the virtual-network viewer in order to access the virtual-network service. The viewer may be used to arrange icons or links indicative of associate banks that participate in the virtual network in a way that is substantially equitable to all lead banks and give associate banks the ability to locate automatically a particular lead bank or loan information memorandum, for example, by searching by borrower's name.

Once becoming a respective authorized member of the virtual-network service, each associate bank can access each virtual network corresponding to each active syndicated loan offering for which the associate bank has been granted access authorization by the lead bank for the offering.

The host web site may provide a generic interface that lists all banks which are presently registered members of the virtual-network service of the network service company in a lead-bank capacity. Only authorized users at associate banks will then be able to access a particular database location corresponding to a given lead bank to see what loan information memoranda are available for their perusal. As suggested above, individual users will have a respective category of access level to the various loan information memoranda so that access to the various financial information is controlled based on the respective category or role assigned to that user. It will be appreciated that access to the transaction-related data may further be a function of the present stage of any given transaction. For example, in a pre-launch transaction stage access may only include agent editors, agent readers and external users, while in a launch stage access may further include investor users. Finally, once a transaction is closed no further access may be given to any user, except those who may be specifically involved in post-closing activities in connection with the transaction.

Each lead bank can include as many loan information memoranda and related information as desired for access by way of its assigned database location in the virtual-network service. A different virtual network is established for each loan information memorandum. Thus, access by associated banks may be controlled through passwords. An associate bank that may be authorized to access the virtual network associated with one syndicated loan offering from a particular lead bank might not be authorized to access the virtual network associated with a different syndicated loan offering, from the same or a different lead bank.

Additional information such as closing documents associated with a loan information memorandum may be added to the lead bank's site. The additional information is forwarded to the network service company which converts the information to an appropriate format and emplaces the new pages with the original loan information memorandum. The virtual-network service of the network service company can disseminate closing documents electronically over the virtual network to associate banks which have elected to become participant banks in the loan transaction. In the post-closing period during the term of the loan, payments under the loan can be managed over the virtual network, and information concerning compliance of the borrower with the terms of the loan generally can be disseminated to participant banks over the network.

For reducing security concerns, it would be preferred that the network services company be responsible for doing any required document conversion concerning a syndication offering within the appropriate virtual network. Typically, such information includes the loan information memorandum, lists of frequently asked questions, and amendments to the loan information memorandum. Information can be converted and emplaced on a virtual network using off-the-shelf Internet conversion and emplacement tools. For example, a loan information memorandum in text form can be converted into a format that can be placed in the lead bank's site. Duly authorized users at associate banks can then access the virtual network for that syndicated loan offering and read the memorandum on a computer display screen using the virtual-network viewer. The users can also download the memorandum, as well as import financial data from the memorandum into commercially available spreadsheet program such as "Excel" or "Lotus" 1-2-3.

If desired, the network service company may provide suitable software spreadsheet modules in the host server that can convert and emplace spreadsheet models associated with a loan information memorandum so that users can consider various financing scenarios without having to import the financial data into a local spreadsheet or create their own macros. Such a spreadsheet service can substantially improve a user's ability to evaluate a loan offering.

As will be appreciated by those skilled in the art, substantially secure communications is particularly of the utmost concern to all parties to a syndicated loan transaction: the borrower, the lead bank, and the associate banks. The virtual network system of the present invention may readily provide substantial intranet security to ensure that information and communications among all the various parties that may be on the virtual network are secure. There are several well-established security and encryption technologies which can be used by the network service company, including both secure socket layer for generic Internet or intranet communications and the security provided by groupware server management software for supporting communications between users of groupware, such as "Lotus Notes" groupware.

Figure 5:
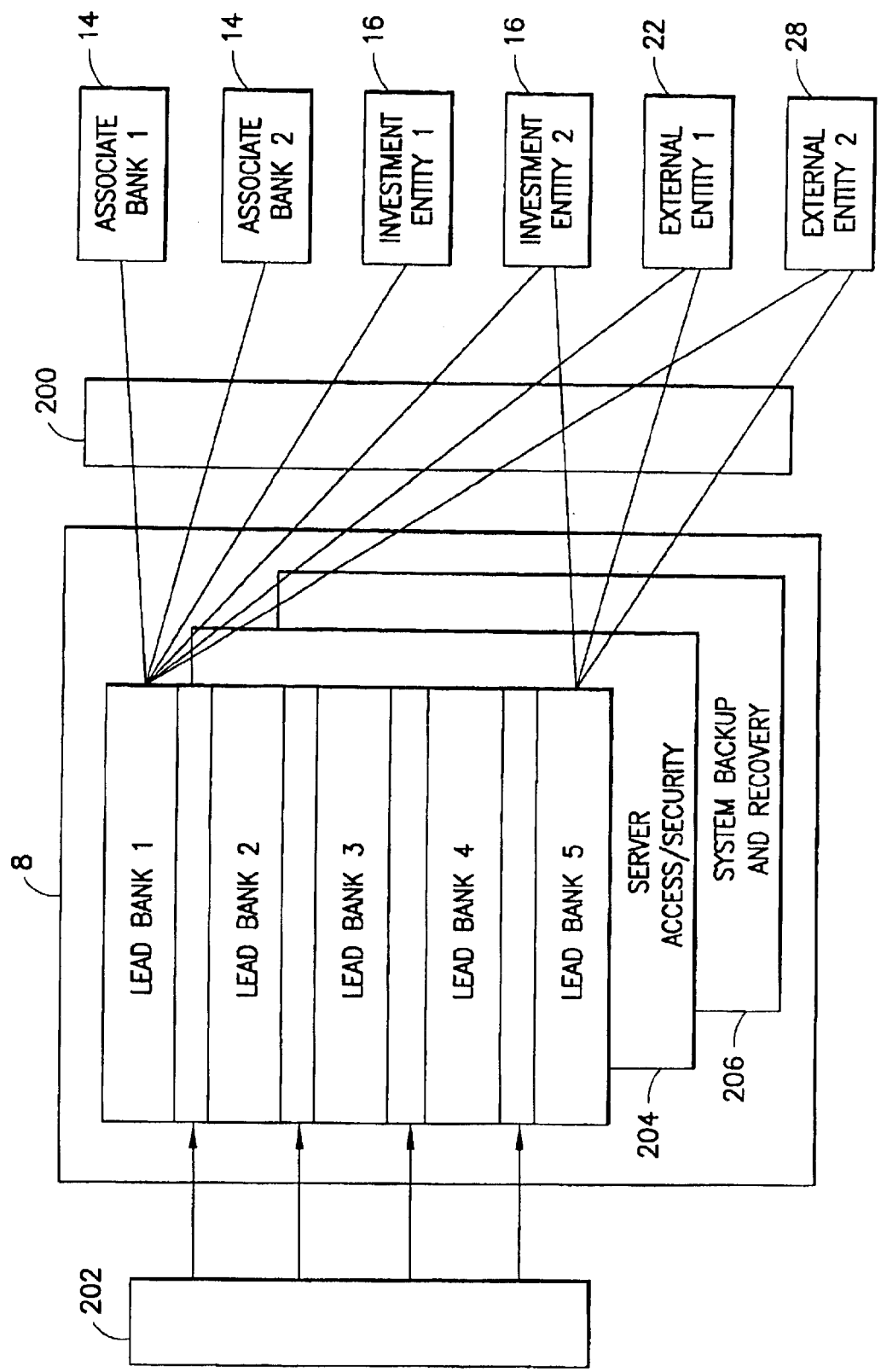
FIG. 5 is an exemplary block diagram of the architecture used by the inventive system to facilitate secure communication among generally unrelated entities.

As shown in FIG. 5, the system of the present invention conveniently provides a centralized firewall 100 that may be employed to protect confidential information so that no unauthorized access to such information occurs. Firewall 100, such as may be effectively used for corporate intranets, can be applied in each virtual network created by communications system 8 of the network service company. Associate banks and other external entities on a virtual network are treated like remote corporate offices and are restricted by firewall 100 from uncontrollable access to the information from each lead bank's site. In addition, if needed, respective inter- bank firewalls 102 may be established between the host site of each lead bank to prevent one lead bank from accessing information in the host site of another lead bank.

The architecture shown in FIG. 5 may be particularly suitable for communication among multiple unrelated entities, since a centralized firewall simplifies the logistics of each user having to separately provide access through their own respective local firewalls. In such a centralized architecture, server access security data is conveniently processed by a central processing module 204, as opposed to being processed at each respective local site of the user. Similarly, system backup and recovery may be better handled by a centralized backup and recovery module 206, as opposed to such recovery tasks being separately handled at a multiplicity of local sites.

As suggested above, usage module 52 may provide substantially continuous monitoring of access and activity by associate banks and other entities throughout the virtual-network-service host site, the virtual-network service company site, each individual lead bank's site, and other sites. This information can be collected and made available to lead banks on a regular basis, and used for billing, planning, marketing, and utilization review.

The communications system of the present invention has the ability to quickly interconnect each designated associate bank to essentially form a virtual network which lasts only for the period that those banks need to access a particular syndicated loan information memorandum, for example, 60 days. Moreover, such system can establish and manage a virtually unlimited number of such virtual networks concurrently in support of a corresponding number of different syndicated loan offerings. Such concurrent virtual networks can be established in an intranet format via a private communications network such as the "IBM Global Network" which can provide substantially secure and reliable connectivity to globally-based businesses. The private communications network can also provide local access services for those companies that may not have Internet access or may want to expand their access for the virtual-network service of the network service company.

To better address the issues discussed above related to bandwidth, latency, etc., it is generally recommended that a dedicated T-1 or cable modem (1.544 Mbps) communications link or the like be established between each respective lead bank and the host site of the network service company for the purpose of high speed access to the virtual networks corresponding to the syndicated loan offerings of the lead bank, as well as updating information accessible over the virtual networks such as amendments to the loan information memorandum and taking part in collaborative communications such as e-mail and video conferencing.

The network service company can monitor each associate bank's access to a specific loan information memorandum. This monitoring capability enables the lead bank to bill accurately its borrower clients for electronic access to loan information by associate banks. As suggested above, the communication system preferably has a software module that can take raw data provided by the server and the network traffic monitoring software and through the use of well known statistical techniques provide detailed billing to the respective lead banks. The usage monitoring software may be readily configured to record the raw data necessary to track and record for example the following parameters:

Subscriber password,

Location of subscriber activity by page,

Time and duration of each activity,

Type of activity (i.e., viewing site, downloading, communications, etc.), and

Bandwidth consumed.

The network service company may readily configure a bill processor in the host server to route the basic telecommunications charges from a communications carrier and break them down into a bill that will give each lead bank the ability to bill back its borrower clients by each offering document. Such processor may also detail all activity by subscriber. The billing processor software preferably formats the raw data in a form that is readily acceptable to the lead bank. Additionally, the billing software can also apply any mark-up or tariffs to the basic telecommunications bill.

Each borrower can therefore be billed back accurately on a monthly basis directly by the network service company for communications services involving the borrower's syndicated loan offering. The bill can detail each associate bank's activity on the virtual network specific to each loan information memorandum, with detailed information about each accessing party, the time spent accessing each loan information memorandum, and each party's activity, such as reviewing the loan information memorandum, and e-mailing comments with respect to the memorandum.

The virtual-network-service host site can be distributed over a plurality of server computers and therefore host server 32 should be viewed as an illustrative example of one of such multiple servers. The server computers can work together to provide essentially seamless access to a large number of users on various platforms with varying communications speeds. The server computers of the network service company can run under server management software for groupware such as "Lotus Notes," which in turn may be responsible for coordination of services, maintaining state and system status, monitoring, security, and other administrative functions.

In another advantage of the present invention, since a subscriber having a suitable Web browser may directly access any server computer, the network service company need not provide each subscriber with subscriber application software that includes software modules for access, activation, viewing, and communications relative to the virtual-network service. Further, such subscribers need not be sent a floppy disk or CD-ROM containing the subscriber application software specific to their requirements.

The user computers may conveniently be personal computers running any suitable operating system software such as a Windows operating system software, commercially available from Microsoft Corporation and should work in conjunction with the "Netscape Navigator" Internet browser, the "Microsoft Explorer" Internet browser, "Lotus Notes" client software and the like. The system operates on the basis that the subscriber's computer is loaded with an Internet browser such as "Netscape Navigator" or "Microsoft Explorer" or groupware client software such as "Notes" or "InterNotes" client software and is connected to a communications link such as a dial-up or dedicated connection to the "IBM Global" Network or a dial-up or dedicated connection to an Internet service provider.

Once a suitably equipped personal computer is available to the user or subscriber, the subscriber should be able to connect to the virtual-network service of the network service company. As will be appreciated by those skilled in the art, the web browser and any required plug-ins can readily provide a virtual-network browser. The browser is conveniently used in order to download and view offering memoranda. The viewer provides subscribers with an interactive and graphic interface to offering memoranda and other associated documents such as annual reports and 10K reports. The virtual-network viewer should provide the ability to play back video clips and other multimedia components of a document. Additionally, the viewer may include the multimedia players or plug-ins that can be used to play back multimedia elements resident in generic HTML pages.

Subscriber access to the virtual-network-service host site and any lead bank's host site may optionally be controlled using "Lotus Notes" management software at the host facility. Each individual user at a subscriber associate bank should have an appropriate password assigned by the network service company after the subscriber bank is authorized by the lead band and the associate bank which employs the user in order to access the virtual-network-service host site. "Notes" management software uses a proprietary security process for access for "Notes" clients, and defaults to secure-socket-layer security for browser clients accessing the service through the Internet. When a user at a subscriber associate bank initiates the opening of a loan information memorandum, for example, the virtual-network-service viewer is preferably launched on a personal computer at the subscriber associate bank which enables the user to view the document.

"Notes" management software can provide the ability to make available select information to a subscriber depending on which transactions the subscriber is authorized to view. When a user at a subscriber associate bank accesses the virtual-network-service host site, he or she should be permitted to see only information from those lead banks concerning those respective loan offerings that the subscriber associate bank has been authorized to view. This security measure can ensure that a subscriber does not become privy to any loan offering transactions being conducted by means of the virtual-network service other than loan offering transactions for which the subscriber has been authorized to view.

The system may also support various collaborative communications capabilities, including video conferencing and white boarding for both Internet browser clients and "Lotus Notes" clients. Video-conferencing and white-boarding capabilities are embedded in "Notes" client software. Depending on the communications capabilities of the Internet browser software installed in the personal computer of a browser client, the plug-ins therein may have to be supplemented to enable Internet browser clients to participate in video conferences and white-boarding sessions.

Each user should first be authorized by both the lead bank as well as the subscribing associate bank which employs the user before the user is given a subscriber password and access to any virtual-network-service site which identifies syndicated loan offerings by the lead bank. The user computers may be interconnectable to the virtual-network-service host site by inputting the network-service company's Internet address into an appropriate field within the browser and initiating connection to the host site via the browser.

When a user at a subscriber associate bank is connected to the virtual-network-service host site, a suitable database management tool, such as anagement tool 36 (FIG. 1), may search a subscriber database and ask for the subscriber's password. The management software can then compare the password entered by the user with the subscriber's password from the subscriber database to ensure that the two passwords are identical. If the passwords match, then the user is guided to a first navigation page of the virtual-network-service host site, which serves to welcome the user and to help prompt him or her through the host site to ensure that the user reaches his or her target destination.

The virtual-network-service host site, using, for example, the database management capabilities of the "Notes" management software, can assist a user from an authorized subscriber in accessing information quickly and easily while providing a high level of security. Using information in the database about each subscriber, the virtual-network service preferably presents custom screens or pages, generated essentially in real time, that list only those lead banks that have authorized that particular subscriber to gain access to the host sites of the lead banks in question. Once a desired lead bank is selected by the user, the user is preferably presented with a list of only those transactions that the subscriber which employs the user is authorized by the lead bank to see. Such a process serves not only as a navigation tool for users, but provides a high level of security in preventing personnel at a subscriber associate bank from learning about loan offerings being handled by the virtual-network service that the subscriber bank has not been authorized to view.

The user log-on screen preferably includes instruction or help scripts and menus that can communicate with the server software to move a user through the access security process. The user will be prompted to enter his or her password in order to access the virtual-network-service host site. The server software can verify automatically the password entered by the user with the password issued by the network-service company which is resident in a subscriber database. All access security procedures provided by the server software should be followed, but in a manner which is effectively transparent to the user. Essentially, all an authorized user from a subscriber bank needs to do in order to access the virtual-network service is to provide the correct password.

The virtual-network-service host site may for example use "Notes" management software to generate hard or soft pages in essentially real time for each subscriber which present only those lead bank sites that the subscriber is authorized to access. An authorized user from a subscriber bank can select a specific lead bank and is then preferably presented with those transactions—and only those transactions—he or she is authorized to see from that particular institution. The user can then select a specific loan offering transaction from the list of authorized transactions and can then view a list of all documents and communications related to the selected transaction. Preferably, the user can only view the loan information memorandum and related loan information if the subscriber which employs the user has the virtual-network viewer provided by the network service company. The virtual-network viewer can be automatically launched if it is present on the subscriber's personal computer.

Of course, the system should enable subscribers to transmit and receive all files in a secure manner. Internet browser clients may be provided with secure-socket-layer encryption and decoding software. Other security techniques which may be used include, for example, if using the "Notes" server software, to use such server software to support secure-socket-layer-encrypted communications as a default to the "Notes" security software. In particular, "Notes" server software can automatically detect whether a user is an Internet browser or a "Notes" client and automatically invokes the appropriate security measures. The secure-socket-layer software on the subscriber's personal computer should be launched automatically for communications if it is not already present in the subscriber's browser application software.

The preferable viewer is preferably an Internet browser software such as "Netscape Navigator" or "Microsoft Explorer" but it could be "Lotus Notes" client software. For example, the "Notes" management software can detect which viewer is being used, and, for users of Internet browser software, automatically convert the network-service company host pages into HTML using "Domino" server software. Subscribers may use all the standard features of the client software to view the documents and conduct communications. Multimedia elements in the pages may be played using the multimedia players embedded in the viewer.

A subscriber should be able to send e-mail messages relative to a specific document the subscriber is authorized to view back to the lead bank which prepared the document, as well as participate in discussion forums relative to the document. Such a discussion forum may be established by a lead bank, which can select which subscribers can participate in the forum. A lead bank may establish a substantially private forum for a specific transaction and limit participation to members of the relevant virtual network associated with the transaction. A lead bank may also establish a general public forum for communications that are not necessarily associated with any particular loan offering or other transaction. An authorized user will be presented with all forums available to him or her, whether related to a specific transaction or not.

E-mail is preferably implemented within the browser application software by presentation as a selection within the user interface—by an e-mail button, for example. Users may be able to click the e-mail button in the browser application software and send a communication back to the lead bank whether the subscriber which employs the user is an Internet browser client or "Lotus Notes" client.

Additionally, any authorized user at a subscriber associate bank should be able to conveniently retrieve e-mail messages sent by the lead bank. The user may be notified when he or she logs into the virtual-network service that there are unread e-mail messages in the subscriber's "in box." Subscribers should also have access to the e-mail messages sent by other subscribers as part of a forum.

E-mail communications may be managed by any commercially available database management system such as the "Notes" database management software. An e-mail message generated by a subscriber with respect to a particular loan offering may go either to 1) the lead bank for that offering, or 2) a forum established by the lead bank for that offering. E-mail messages specific to a transaction may be linked to the transaction as "threaded discussions" and may be hierarchically organized and presented within the virtual-network-service software. A specific screen or page should be created as part of the software application that lists each transaction and all related communications as posted by the lead bank. Preferably, only the lead bank should have the ability to post e-mail messages to a transaction offered by the lead bank or to establish a forum relative to one of its transactions. For a forum, e-mail messages should preferably be automatically posted in the forum and hierarchically organized as part of the "threaded discussion."

An authorized user at a subscriber associate bank should be able to store e-mail messages locally which he or she generates as well as e-mail messages received from a lead bank or read as part of a forum. Preferably, the e-mail user interface includes an option to enable an authorized user to name and store the e-mail on a user-interface "desktop," a hard disk, a floppy disk or other external storage device. Other standard housekeeping functions should also be provided, such as deletion of e-mail messages. Subscribers preferably should not have the option of forwarding e-mail messages in order to discourage users from forwarding an e-mail message relative to a specific transaction to a party not authorized to be privy to the transaction.

Lead banks should have the option of creating video clips which may be produced and encoded by the network-service company. Such video clips may be sent to select subscribers or broadcast to all subscribers. The video clip or other v-mail communication may be stored at the virtual-network-service host site and may be downloaded by those subscribers who are authorized to receive v-mail by the lead bank which originated the v-mail.

The ability to designate those subscribers that can receive a particular v-mail transmission may be determined by the lead bank using the syndicate-desk application which should enable a lead bank to designate recipients of v-mail transmissions on a case-by-case basis. A subscriber who is designated to receive a v-mail transmission may be notified via the "Notes" management software that a v-mail transmission is waiting in the subscriber's "in box" the same way that the subscriber is notified of unread e-mail messages.

Once a subscriber has been notified of a pending v-mail transmission, the subscriber should be prompted to download the transmission. Video clips or other video transmissions may be downloaded to a local e-mail server or to the subscriber's hard disk if no local e-mail server is present.

Subscriber application software should support video conferencing and white boarding communications between subscribers and the lead banks. Preferably, only a lead bank may establish a video conference or a white boarding session. The lead bank designates those subscribers that are authorized to participate in the session.

As should be appreciated from the above description of the features of the present system, the users are no longer confined to any specific groupware, such as Lotus Notes groupware, in order to obtain access to an external service provider. The present invention conveniently eliminates any specific groupware requirement by allowing Internet access using any commercially available Internet browser.

Reference is now made to an example architecture for a system of the present invention having a local domain, a server domain and a remote user. Within the local domain, a sender computer may use Lotus Notes to create a document or memoranda or control sending of an electronically loaded document destined for the remote user. The sender computer is used by a user to code the message using a secondary domain name such as @ secure which causes a mailbox to transfer the message to an @ secure domain database. The message is then replicated over a dedicated connection to a transition database in the server domain. An email message is sent from the transition database via a conventional SMTP connection through the internet to the remote user. The remote user initiates a connection via the internet to the server domain where a programmed processor establishes an encryption connection to the remote user. Once the appropriate encrypted protocol is established and passwords and ID confirmed, the programmed processor allows the remote user to view or receive the message via encrypted transfer.

Referring now to an alternate architecture example in which security is established between a sender computer and a server domain (using a similar encryption protocol as just described between the server domain and a remote user) it is noted that in this example information can be transmitted or accessed by mobile users. In this form, the server domain processes all messages in encrypted form and still sends email notification of available documents using conventional SMTP.

It will be understood that the specific embodiment of the invention shown and described herein is exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A system for interchanging documents between a sender computer associated with a sending party, a server, and a receiver computer associated with a receiving party, comprising:

selecting means for selecting the receiving party as an intended recipient of a document, wherein the receiving party has an identifier associated therewith;

adding means for adding a security designation to the identifier;

sender computer storage means for storing one of the documents;

server storage means;

first uploading means for uploading the document stored in the sender computer storage means into the server storage means as an uploaded document, wherein the uploaded document is uploaded to the server storage means based upon the security designation;

notification message issuing means for issuing a notification message from the server to the intended recipient, the notification message indicating that the uploaded document is available in the server storage means; and downloading means for downloading the document from the server storage means-into a receiver computer storage means upon the issuance by the receiver computer of a download command signal to the server.

2. The system of claim 1, wherein the documents are interchanged between the sender computer and one or more of a plurality of receiver computers, each associated with a respective receiving party; wherein the selecting means for selecting the receiving party as an intended recipient of a document further comprises selecting means for selecting one or more of the receiving parties as intended recipients of a document; wherein the means for adding a security designation to the identifier further comprises means for adding a security designation to each identifier associated with each of the selected receiving parties; wherein the notification message issuing means for issuing a notification message further comprises means for issuing a notification message from the server to the intended recipients; and wherein the downloading means for downloading the document from the server storage means into the receiver computer storage means further comprises means for downloading the document from the server storage means into respective ones of a plurality of receiver computer storage means associated with each of the intended recipients.

3. The system of claim 2, wherein the notification message issuing means for issuing the notification message further comprises means for issuing the notification message via email.

4. The system of claim 2, wherein the uploading means for uploading the document stored in the sender computer storage means further comprises means for uploading the document at predetermined time intervals.

5. The system of claim 2, wherein the notification message includes data indicative of new documents uploaded into the server storage means from the sender computer storage means since the issuance of a previous notification message.

6. The system of claim 2, wherein the notification message issuing means for issuing a notification message further comprises means for issuing a message report to the sending party, wherein the message report includes data indicative of whether a document has been downloaded by a given recipient.

7. The system of claim 1, wherein each of the interchanged documents is in the form of a computer file.

8. The system of claim 7, wherein the computer file includes one of at least text data, still image data, moving image data, and audio data.

9. The system of claim 1, wherein the sender computer storage means is local relative to the sender computer, the server storage means is local relative to the server, and the receiver computer storage means is local relative to the receiver computer.

10. The system of claim 1, wherein the first uploading means further comprises a sender client software program associated with the sender computer in communication with a server software program associated with the server.

11. The system of claim 10, wherein the sender client software program comprises a software program selected from the group including: a) a web browser and b) a Lotus Notes client software program and the server software program comprises a web server software program.

12. The system of claim 1, wherein the downloading means further comprises a receiver client software program associated with the receiver computer in communication with a server software program associated with the server.

13. The system of claim 12, wherein the receiver client software program comprises a web browser and the server software program comprises a web server software program.

14. The system of claim 1, wherein the identifier is a unique identifier.

15. The system of claim 1, wherein the identifier is an email address.

16. The system of claim 1, further comprising:

assigning means for assigning an edit rights level to the uploaded document; and second uploading means for uploading an edited version of the document from the receiver computer storage means into the server storage means as an uploaded edited document if the edit rights level assigned to the uploaded document in the server storage means permits editing.

17. A method for interchanging documents between a sender computer associated with a sending party, a server, and a receiver computer associated with a receiving party, comprising:

selecting the receiving party as an intended recipient of a document, wherein the receiving party has an identifier associated therewith;

adding a security designation to the identifier;

storing one of the documents in a sender computer storage means;

uploading the document stored in the sender computer storage means into a server storage means as an uploaded document, wherein the uploaded document is uploaded to the server storage means based upon the security designation;

issuing a notification message from the server to the intended recipient, the notification message indicating that the uploaded document is available in the server storage means; and downloading the uploaded document from the server storage means into a receiver computer storage means upon the issuance by the receiver computer of a download command signal to the server.

18. The method of claim 17, wherein the documents are interchanged between the sender computer and one or more of a plurality of receiver computers, each associated with a respective receiving party; wherein the step of selecting the receiving party as an intended recipient of a document further comprises selecting one or more of the receiving parties as intended recipients of a document; wherein the step of adding a security designation to the identifier further comprises adding a security designation to each identifier associated with each of the intended recipients; wherein the step of issuing a notification message further comprises issuing a notification message from the server to the intended recipients; wherein the step of downloading the document from the server storage means into the receiver computer storage means further comprises downloading the document from the server storage means into respective ones of a plurality of receiver computer storage means associated with each of the intended recipients.

19. The method of claim 18, wherein the step of issuing the notification message further comprises issuing the notification message via email.

20. The method of claim 18, wherein the step of uploading the document stored in the sender computer storage means further comprises uploading the document at predetermined time intervals.

21. The method of claim 18, wherein the notification message includes data indicative of new documents uploaded into the server storage means from the sender computer storage means since the issuance of a previous notification message.

22. The method of claim 18, wherein the step of issuing a notification message further comprises issuing a message report to the sending party, wherein the message report includes data indicative of whether a document has been downloaded by a given recipient.

23. The method of claim 18, wherein at least one of the steps of: a) selecting one or more of the receiving parties as intended recipients; b) adding a security designation to each identifier associated with each of the intended recipients; c) uploading the document stored in the sender computer storage means into the server storage means; d) issuing a notification message from the server to the intended recipients; and e) downloading the document from the server storage means into the receiver computer storage means associated with each of the intended recipients is carried out via a communications network.

24. The method of claim 23, wherein the communications network is a global communications network.

25. The method of claim 17, wherein the sending party and the receiving party are engaged in a transaction selected from the group of: a) a loan syndication transaction; b) a bond underwriting transaction; c) an equity underwriting transaction; d) a high yield debt placement transaction; e) a private placement asset transaction; f) a corporate financing transaction; g) a mortgage financing; h) a municipal financing; i) an asset backed financing; j) a primary insurance transaction; k) a reinsurance transaction; l) an acquisition transaction; and m) a divestiture transaction.

26. The method of claim 17, wherein each of the interchanged documents is in the form of a computer file.

27. The method of claim 26, wherein the computer file includes one of at least text data, still image data, moving image data, and audio data.

28. The method of claim 17, wherein the sender computer storage means is local relative to the sender computer, the server storage means is local relative to the server, and the receiver computer storage means is local relative to the receiver computer.

29. The method of claim 1, wherein the identifier is a unique identifier.

30. The method of claim 1, wherein the identifier is an email address.

31. The method of claim 1, further comprising:
assigning an edit rights level to the uploaded document; and
uploading an edited version of the document from the receiver computer storage means into the server storage means as an uploaded edited document if the edit rights level assigned to the uploaded document in the server storage means permits editing.

32. A system for interchanging documents between a sender computer which is associated with a sending party and which includes a sender computer storage means, a server which includes a server storage means, and a receiver computer which is associated with a receiving party and which includes a receiver computer storage means, comprising:
selecting means for selecting the receiving party as an intended recipient of a document, wherein the receiving party has an identifier associated therewith;
adding means for adding a security designation to the identifier;
first uploading means for uploading one of the documents stored in the sender computer storage means into the server storage means as an uploaded document, wherein the uploaded document is uploaded to the server storage means based upon the security designation;
notification message issuing means for issuing a notification message from the server to the intended recipient, the notification message indicating that the uploaded document is available in the server storage means; and
downloading means for downloading the uploaded document from the server storage means into the receiver computer storage means upon the issuance by the receiver computer of a download command signal to the server.

33. The system of claim 32, wherein the documents are interchanged between the sender computer and one or more of a plurality of receiver computers, each associated with a respective receiving party; wherein the selecting means for selecting the receiving party as an intended recipient of a document further comprises selecting means forselecting one or more of the receiveing parties as intended recipients of a document; wherein the means foradding a security designation to the identifier further comprises means for adding a security designation to each identifier associated with each of the intended recipients; wherein the notification message issuing means for issuing a notification message further comprises means for issuing a notification message from the server to the intended recipients; and wherein the downloading means for downloading the document from the server storage means into the receiver computer storage means further comprises means for downloading the document from the server storage means into respective ones of a plurality of receiver computer storage means associated with each of the intended recipients.

34. The system of claim 33, wherein the notification message issuing means for issuing the notification message further comprises means for issuing the notification message via email.

35. The system of claim 33, wherein the uploading means for uploading the document stored in the sender computer storage means further comprises means for uploading the document at predetermined time intervals.

36. The system of claim 33, wherein the notification message includes data indicative of new documents uploaded into the server storage means from the sender computer storage means since the issuance of a previous notification message.

37. The system of claim 33, wherein the notification message issuing means for issuing a notification message further comprises means for issuing a message report to the sending party, wherein the message report includes data indicative of whether a document has been downloaded by a given recipient.

38. The system of claim 32, wherein each of the interchanged documents is in the form of a computer file.

39. The system of claim 38, wherein the computer file includes one of at least text data, still image data, moving image data, and audio data.

40. The system of claim 32, wherein the sender computer storage means is local relative to the sender computer, the server storage means is local relative to the server, and the receiver computer storage means is local relative to the receiver computer.

41. The system of claim 32, wherein the first uploading means further comprises a sender client software program associated with the sender computer in communication with a server software program associated with the server computer.

42. The system of claim 41, wherein the sender client software program comprises a software program selected from the group including: a) a web browser and b) a Lotus Notes client software program and the server software program comprises a web server software program.

43. The system of claim 32, wherein the downloading means further comprises a receiver client software program associated with the receiver computer in communication with a server software program associated with the server.

44. The system of claim 43, wherein the receiver client software program comprises a web browser and the server software program comprises a web server software program.

45. The system of claim 32, wherein the, identifier is a unique identifier.

46. The system of claim 32, wherein the identifier is an email address.

47. The system of claim 32, further comprising:

assigning means for assigning an edit rights level to the uploaded document; and second uploading means for uploading an edited version of the document from the receiver computer storage means into the server storage means as an uploaded edited document if the edit rights level assigned to the uploaded document in the server storage means permits editing.

* * * * *